(12) United States Patent
Kumano et al.

(10) Patent No.: US 7,173,509 B2
(45) Date of Patent: Feb. 6, 2007

(54) CORE HAVING SUPERIOR END FACE INSULATION AND METHOD OF TREATING CORE END FACES TO GIVE INSULATION COATING

(75) Inventors: Tomoji Kumano, Kitakyushu (JP); Chikara Kaido, Futtsu (JP); Hiroyasu Fujii, Kitakyushu (JP); Kazutaka Higashine, Tokyo (JP); Osamu Tanaka, Kitakyushu (JP); Norikazu Fujii, Kitakyushu (JP); Kazufumi Hanzawa, Kitakyushu (JP); Masayoshi Tanaka, Tokyo (JP); Yuji Kubo, Futtsu (JP); Noriko Yamada, Futtsu (JP)

(73) Assignees: Nippon Steel Corporation, Tokyo (JP); Nittetsu Plant Designing Corporation, Fukuoka (JP)

( * ) Notice: Subject to any disclaimer, the term of this patent is extended or adjusted under 35 U.S.C. 154(b) by 44 days.

(21) Appl. No.: 10/433,524

(22) PCT Filed: Oct. 4, 2002

(86) PCT No.: PCT/JP02/10385

§ 371 (c)(1),
(2), (4) Date: Jun. 4, 2003

(87) PCT Pub. No.: WO03/031681

PCT Pub. Date: Apr. 17, 2003

(65) Prior Publication Data

US 2004/0046632 A1    Mar. 11, 2004

(30) Foreign Application Priority Data

| Oct. 5, 2001 | (JP) | 2001-310379 |
| Mar. 20, 2002 | (JP) | 2002-077613 |
| Jul. 24, 2002 | (JP) | 2002-215387 |
| Jul. 25, 2002 | (JP) | 2002-216949 |
| Jul. 31, 2002 | (JP) | 2002-222759 |
| Aug. 23, 2002 | (JP) | 2002-242967 |
| Sep. 24, 2002 | (JP) | 2002-277578 |

(51) Int. Cl.
*H01F 27/28* (2006.01)
*B05D 3/02* (2006.01)

(52) U.S. Cl. ..................... 336/233; 427/387
(58) Field of Classification Search ............ 252/62.54, 252/62.51 R; 427/384, 387; 148/104, 306, 148/307; 336/233–234; 29/596
See application file for complete search history.

(56) References Cited

U.S. PATENT DOCUMENTS

| 3,271,718 | A | * | 9/1966 | Shaw ........................ 428/220 |
| 4,482,880 | A | * | 11/1984 | Ohta et al. .................. 336/217 |
| 5,671,526 | A | * | 9/1997 | Merlano ..................... 29/609 |
| 6,156,374 | A | | 12/2000 | Forbes et al. |
| 6,198,130 | B1 | * | 3/2001 | Nobuto et al. .............. 257/343 |
| 6,558,565 | B1 | * | 5/2003 | Matsutani et al. ....... 252/62.55 |

FOREIGN PATENT DOCUMENTS

| EP | 0407289 A1 | 1/1991 |
| EP | 0 884 825 | 12/1998 |
| JP | 48-37192 | 11/1973 |
| JP | 61-10963 | 4/1986 |
| JP | 61-63003 | 4/1986 |
| JP | 62-57470 | 3/1987 |
| JP | 4-323382 | 11/1992 |
| JP | 5-326288 | 12/1993 |
| JP | 09-323066 | 12/1997 |
| JP | 10-256070 | 9/1998 |
| JP | 11-12756 | 1/1999 |
| JP | 2000-282249 | 10/2000 |
| JP | 2001-143943 | 5/2001 |
| JP | 2002-246238 | 8/2002 |
| JP | 2004111884 A * | 4/2004 |
| RU | 129721 | 5/1960 |
| RU | 175560 | 10/1965 |

OTHER PUBLICATIONS

"Magnetic Cores Of Power Transformers", *ENERGHIA* (*Power Engineering*), Publishing House, Moscow, 1973, pp. 210-213, G.V. Alexeienko et al., with English translation.

Edited by Kinzoku Zairyo Gijutsu Kenkyusho, "Zukai Kinzoku Zairyo Gijutsu Yogo Jiten", first edition, first print, The Kikkan Kogyo Shinbun, Ltd., Nov. 20, 1988, p. 536.

* cited by examiner

*Primary Examiner*—Anh T. Mai
(74) *Attorney, Agent, or Firm*—Kenyon & Kenyon LLP

(57) ABSTRACT

A means for treating the end faces of a core which is used for an electrical apparatuses and etc., to give insulation extremely superior in effect of improvement of the insulation, corrosion resistance, adhesiveness, heat resistance, and magnetic properties at a low temperature in a short time without cleaning for removing punching oil, annealing, or other pre-treatment; a core having an insulation coating comprised of a dry film of a pure silicone polymer, modified silicone polymer, and/or mixed silicone polymer as a silicone compound on the core end faces and having an average film thickness of at least 0.5 μm, a breakdown voltage of at least 30V, and a heat resistance in the air of at least 400° C.; and a method of production comprised of forming a core, then dipping it in or spraying it by one or more types of a pure silicone polymer, modified silicone polymer, and/or mixed silicone polymer as an insulation coating.

4 Claims, 5 Drawing Sheets

CORE HAVING SUPERIOR END FACE INSULATION AND METHOD OF TREATING CORE END FACES TO GIVE INSULATION COATING

TECHNICAL FIELD

The present invention relates to a core having end faces, caused by cutting, punching, etc. the core in the process of producing a core using magnetic steel sheet, treated to be covered by an insulation coating extremely superior in insulation, adhesiveness, corrosion resistance, etc. and a method of insulation treatment for the same.

Further, the present invention relates to a core of electrical apparatuses on which silicone compounds having Si—O bonds coated and deposited so as to improve the properties and prevent short-circuits and a method of production of the same and to a high temperature operating electrical apparatus and method of production of the same.

Here, the "transformer" is an electrical apparatuses which are motor core, generator and transformer in the broad sense of a stationary apparatus produced by stacking or winding a magnetic material and including a high frequency band used for changing a voltage. The "magnetic material" means oriented magnetic steel sheet, non-oriented magnetic steel sheet, amorphous metal, permalloy, and other known soft magnetic materials having ferromagnetism used for large-sized to small-sized transformers.

BACKGROUND ART

When using non-oriented magnetic steel sheet for a motor core or stationary apparatus, the core is made by slitting a magnetic steel sheet coil, punching it into predetermined shapes, stacking a predetermined number of these shapes, then clamping them by welding, calking, bolting, band clamping, molding, bonding, etc. In the case of using a transformer core made of a grain-oriented electrical steel sheet, the strip coil is slitted, cut or punched into a predetermined shape, and thereafter these shaped sheets are fabricated to stacked core or wound core. Transformers come in roughly three types:

1) Mainly medium-sized to large-sized "stacked transformers" having oriented magnetic steel sheet stacked to form a core 2) Small-sized "wound transformers" having oriented magnetic steel-sheet or amorphous metal wound to form a core 3) "Small-sized transformers" including switching power source attachments attached to apparatuses having mainly non-oriented magnetic steel sheet, oriented magnetic steel sheet, amorphous metal, and permalloy as stacked and wound cores (EI cores etc.)

Medium- and large-sized transformers called "stacked transformers" of 1) are transformers used in ultra-high voltage substations and primary substations to intermediate substations. They are produced by stacking oriented magnetic steel sheet and fastening them by bolts and nuts or special tape or if necessary annealing or varnishing and attaching windings.

Small-sized transformers called "wound transformers" of 2) are small-sized transformers for power distribution use positioned downstream of intermediate substations. They are assembled by winding slit oriented magnetic steel sheet and amorphous metal to a predetermined size, shaping this, then strain annealing, again shaping, then winding conductors.

The EI cores and other small-sized transformers attached to electrical apparatuses of 3) are not limited to oriented magnetic steel sheet and may also use non-oriented magnetic steel sheet. They are formed by cutting or punching the-sheet to predetermined sizes, then stacking. Sometimes they are also produced by winding.

Note that the above distinctions are peculiar to Japan. In other countries, particularly in Europe, there is no classification of 2). This is considered a small-size of the classification 1).

All transformers basically mainly use magnetic steel sheet or amorphous metal as the material for the core in order to secure efficiency.

Among these, magnetic sheet sheet is produced by steelmakers. The final form in the steelmakers is normally coiled steel sheet of a thickness of 0.20 mm to 0.70 mm. This is slit into the necessary width, then further cut into the necessary lengths and cut into the final sizes.

The surface of magnetic steel sheet is normally treated to give it an insulation coating. Varnishing and bluing are performed with the purpose of improving the corrosion resistance and insulation of the end faces of the core (surfaces formed by punching, cutting, etc.) The surface insulation coating of magnetic steel sheet used in this way has an effect on the corrosion resistance, punchability, weldability, and insulation. In particular, much research regarding improvement of the insulation has been performed from the viewpoint of improving the insulation between steel sheets at the time of stacking so as to suppress an increase in iron loss due to eddy current loss.

In the past, as the insulation coating agent for the surface of steel sheet, an organic type coating agent have been used in a grain-oriented electrical steel sheet, and an inorganic type, organic type, and composite inorganic-organic type coating agents have been used in non-oriented electrical steel sheet in accordance with the application of use or objective. An excellent heat resistant insulation film is required for a grain-oriented electrical steel sheet because forsterite film formed during secondary recrystallization annealing on the surface of the steel sheet and therefore heat-flattening treatment at 800–900° C. must be done to coil-set and to remove stress. In addition, a grain-oriented electrical steel sheet has a considerable improvement of iron loss and magnetic strain by film tensioning effect. As mentioned above, an organic type coating agent as the insulation coating is not suitable for a grain-oriented electrical steel sheet. In general, an inorganic type coating is superior in heat resistance and weldability, but inferior in punchability. On the other hand, an organic coating is superior in punchability and adhesiveness, but inferior in heat resistance and weldability. In recent years, to eliminate the defects in the two, composite inorganic-organic type coatings able to exhibit performance between the two have come into general use. With only the insulation coating formed at the time of producing the steel sheet, however, the insulation becomes insufficient or, in the case of including an annealing step, the insulation drops considerably, so varnishing or other insulation becomes necessary.

In particular, in recent years, it has been discovered that the insulation at the end faces of the core formed by punching or cutting has a large effect on the core efficiency. There has been rising demand for development of an industrially superior technique for treating the end faces of cores. With the method of insulation treatment of the end faces of cores used generally in the past, however, while considerably effective for improvement of the corrosion resistance or insulation, the adhesiveness, coating strength, and insulation have been insufficient.

For example, bluing not only results in poor insulation and corrosion resistance, but also inferior stability and gives rise to tremendous cost increases in the heat treatment step.

Further, treatment by an organic compound or a varnish comprised mainly of an organic compound is effective in its own right for corrosion resistance and insulation, but is insufficient for adhesiveness, coating strength, insulation, and heat resistance. In particular, the problem of poor wetability means that cleaning or annealing is required as pre-treatment. Further, for heat resistance as well, this is unsuitable when the process of formation of the core includes aluminum diecasting or other heat treatment.

Further, treatment by phosphate or another inorganic-type insulation coating, like treatment by organic type and semi-organic type coating, requires pre-treatment and requires high temperature drying. In coating performance as well, there are the problems that thick coating is difficult, the adhesiveness is poor, the insulation coating detaches due to annealing, etc. These prior art have had many problems from the viewpoint of the work environment and efficiency and further improvement is desired.

Further, phenol resin laminates, silicone resin laminates, molded phenol products, and other synthetic resin insulating materials are used as insulators, but these are not coated directly on the end faces of the cores, but are wound or adhered as finished products and therefore cannot prevent drops in insulation due to burrs etc. of the end faces.

Further, in recent years, transformers using amorphous metal as the material of the cores have also been produced, but in the production of the transformers, due to the "weak stiffness", at the time of "core insertion (lacing)", temporary fastening is performed due to the "tearing" of the amorphous foil. Measures for prevention of this "tearing" are necessary. The cores of the completed transformers are mainly dipped in oil, but the temporary fastening and fixing solution used for prevention of this "tearing" requires oil resistance. There are inherent limitations on the properties sought from the viewpoint of work efficiency and labor health.

As electrical apparatuses, there are motors, actuators, generators, transformers, reactors, and other electromagnetic apparatuses or heaters etc. Electromagnetic apparatuses are generally comprised of conductors for carrying a current and a magnetic circuit for carrying magnetic flux.

A large amount of current is passed through the conductors to achieve a high output of the electromagnetic apparatus. If a large current is passed through the conductors, however, the conductors or peripheral materials are heated, the electrical insulation of the conductors or magnetic materials is destroyed, and problems arise in fastening the members of the apparatuses.

The magnetic circuit uses a core and yoke. Most cores used are stacks of magnetic steel sheet. For bundling the stacked core, calking, welding, bolting, etc. are frequently used. With calking and welding, electrical short-circuits occur between the stacked layers. With AC excitation, a short-circuiting current is produced and a drop in the performance-of the apparatus is caused. Therefore, sometimes molding or bonding is used for the bundling between magnetic steel sheets. With molding or bonding, however, use at a high temperature is not possible.

In a heater, the heating element is fastened and insulated by a ceramic or other member able to breakdown a high temperature. This fastening is partial. Time and labor are required for the assembly process and sometimes noise and vibration become problems due to the partial fastening. With bonding etc., complete fastening is possible. If insulation could be secured, the process would become simple and automation would also become possible, but at the present time, there is no method of bonding able to be used at a high temperature.

DISCLOSURE OF INVENTION

An object of the present invention is to provide an extremely fast and easy coating for covering end faces as new technology for treating the end faces of a core to give an insulating coating taking the place of conventional varnishing, bluing, and other heat treatment due to the fact there are many problems in the adhesiveness, insulation, corrosion resistance, heat resistance, and work efficiency of an insulation coating after baking in conventional treatment to give an insulation coating based on bluing and varnishing to improve the corrosion resistance and insulation of end faces of cores.

Another object of the present invention is to provide an electrical apparatus and method of production of the same enabling operation at a high temperature.

Still another object of the present invention is to provide a member for an electrical apparatus suppressed in electrical short-circuits and stress and strain accompanying bundling and improved in surface and a simple method of bundling for the same.

(1) A core having a superior end face insulation characterized in that end faces of the core are treated to give an insulation coating of an average film thickness of at least 0.5 μm comprised of at least 30 wt % of a silicone compound converted to $SiO_2$.

(2) A core having a superior end face insulation as set forth in (1), characterized in that an average film thickness of said insulating coating is at least 2 μm and a breakdown voltage is at least 30V.

(3) A core having a superior end face insulation as set forth in (1) or (2), characterized in that said insulating coating has a heat resistance in air of at least 400° C.×1 hour.

(4) A core having a superior end face insulation as set forth in any one of (1) to (3), characterized in that said silicone compound is a dried coating comprised of one or more types of a silicone resin, alkali silicate, colloidal silica, low melting point glass frit, a pure silicone polymer comprised of a compound produced by a hydrolysis reaction and dehydration condensation reaction of one or more types of substances expressed by $(R^1)_n Si(X^1)_{4-n}$ (where n is an integer of 0 to 3, $R^1$ is an alkyl group or phenyl group, the plurality of $R^1$ able to be different when n=2 or 3, $X^1$ being Cl (chlorine) or an alkoxy group expressed by $(OR^2)$, where $R^2$ is an alkyl group, and the plurality of $R^2$ able to be different when n=0, 1, or 2), a modified silicone polymer comprised of a compound produced by a hydrolysis reaction and dehydration condensation reaction of one or more types of substances expressed by $(R^3)_n Si(X^2)_{4-n}$ (where n is an integer of 0 to 3, $R^3$ is an organic functional group other than an alkyl group or phenyl group, the plurality of $R^3$ able to be different when n=2 or 3, $X^2$ being Cl (chlorine) or an alkoxy group expressed by $(OR^4)$, where $R^4$ is an alkyl group, and the plurality of $R^4$ able to be different when n=0, 1, or 2), and a mixed silicon polymer produced by a hydrolysis reaction and dehydration condensation of one or more types of compounds expressed by $(R^1)_n Si(X^1)_{4-n}$ (where n is an integer of 0 to 3, $R^1$ is an alkyl group or phenyl group, the plurality of $R^1$ able to be different when n=2 or 3, $X^1$ being Cl (chlorine) or an alkoxy group expressed by $(OR^2)$, where $R^2$ is an alkyl group, and the plurality of $R^2$ able to be different when n=0, 1, or 2) and one or more types of substances expressed by $(R^3)_nSi(X^2)_{4-n}$ (where n is an integer of 0 to 3, $R^3$ an organic functional group other than an alkyl group or phenyl group, the plurality of $R^3$ able to be different when n=2 or 3, $X^2$ being Cl (chlorine) or an alkoxy group expressed by $(OR^4)$, where $R^4$ is an alkyl group, and the plurality of $R^4$ able to be different when n=0, 1, or 2).

(5) A core having a superior end face insulation as set forth in (4), characterized in that said pure silicone polymer is a compound where the number of carbon atoms in the $R^1$ and $R^2$ alkyl groups is not more than 4 and produced by a hydrolysis reaction and partial dehydration condensation reaction of one or more substances selected from tetramethoxysilane, tetraethoxysilane, tetraisopropoxysilane, tetrabutoxysilane, monomethyltrimethoxysilane, monomethyltriethoxysilane, monomethyltriisopropoxysilane, monomethyltributoxysilane, monoethyltrimethoxysilane, monoethyltriethoxysilane, monoethyltriisopropoxysilane, monoethyltributoxy-silane, dimethyldimethoxysilane, dimethyldiethoxy-silane, diethyldimethoxysilane, diethyldietoxysilane, phenyltrimethoxysilane, diphenyldimethoxysilane, phenyltriethoxysilane, and diphenyldiethoxysilane and said modified silicone polymer is one or more of an acryl-modified silicone polymer, alkyd-modified silicone polymer, polyester acryl-modified silicone polymer, epoxy-modified silicone polymer, amino-modified silicone polymer, vinyl-modified silicone polymer, and fluorine-modified silicone polymer.

(6) A core having a superior end face insulation as set forth in any one of (1) to (5), characterized in that the metal element or semimetal element M in said insulation coating other than oxygen (O), carbon (C), hydrogen (H), nitrogen (N), sulfur (S), and fluorine (F) is mainly silicon (Si) and said Si is mainly present in a form having an Si—O bond and that said M other than Si is one or more elements selected from Li, Na, K, Mg, Ca, Cr, Mn, Fe, Co, Ni, Cu, Zn, Y Ti, Zr, Nb, B, Al, Ge, Sn, P, Sb, and Bi.

(7) A core having a superior end face insulation as set forth in any one of (1) to (6), characterized in that the total weight ratio of Si, Li, Na, K, Mg, Ca, Cr, Mn, Fe, Co, Ni, Cu, Zn, Y, Ti, Zr, Nb, B, Al, Ge, Sn, P, Sb, and Bi with respect to the total weight of elements in said insulation coating other than oxygen (O), carbon (C), hydrogen (H), nitrogen (N), sulfur (S), and fluorine (F) is at least 90 parts by weight and in that the weight ratio of Si with respect to the total weight of elements in said insulation coating other than O, C, H, N, and S is at least 50 parts by weight.

(8) A core having a superior end face insulation as set forth in any one of (1) to (7), characterized in that the body of said core is comprised of non-oriented magnetic steel sheet.

(9) A transformer core extremely superior in insulation and corrosion resistance characterized by having an insulation coating comprised of a pure silicone polymer on end faces and surfaces of stacked steel sheets of a magnetic material.

(10) A transformer core extremely superior in insulation and corrosion resistance characterized by having conductors at a core comprised of stacked magnetic materials and having an insulation coating comprised of a pure silicone polymer on the surfaces of and between the magnetic materials and conductors.

(11) A transformer core extremely superior in insulation and corrosion resistance as set forth in (9) or (10), characterized in that the insulation coating has an average film thickness of 0.5 to 100 µm and a breakdown voltage of at least 30V.

(12) A magnetic member for an electromagnetic apparatus comprised of a plurality of pieces of a magnetic material punched into substantially the same shapes stacked and joined together by a silicone polymer, said magnetic member for an electromagnetic apparatus characterized by being joined without local application of strain and/or stress to the pieces of the magnetic material.

(13) A magnetic member for an electromagnetic apparatus as set forth in (12), wherein an armature core is comprised of a plurality of divided core pieces.

(14) A high temperature operating electrical apparatus characterized by having conductors or conductors and magnetic materials joined together while securing electrical insulation between adjoining members of the same or different type using as a solution exhibiting the ability to mutually fasten and hold adjoining members after being coated and dried between adjoining members and having the ability to fasten and bundle even at a high temperature of over 200° C. a pure silicone polymer comprised of a compound produced by a hydrolysis and partial dehydration condensation reaction of one or more pure silicone polymer expressed by $(R^1)_nSi(X^1)_{4-n}$ (where n is an integer of 0 to 3, $R^1$ is an alkyl group or phenyl group, the plurality of $R^1$ able to be different when n=2 or 3, $X^1$ being Cl (chlorine) or an alkoxy group expressed by $(OR^2)$, where $R^2$ is an alkyl group, and the plurality of $R^2$ able to be different when n=0, 1, or 2).

(15) A method of processing a core and treating end faces of the core to give an insulation coating comprising, when producing the core, punching or cutting a material to predetermined shapes, stacking and clamping them, annealing or not annealing them, treating the end faces of the core to give an insulation coating, and drying and/or baking the same, said method of treating end faces of a core to give an insulation coating characterized by using as an insulating coating treatment agent one or more types of a silicone resin, alkali silicate, colloidal silica, low melting point glass frit, a pure silicone polymer sol comprised of a solution including a compound produced by a hydrolysis reaction and dehydration condensation reaction of one or more types of substances expressed by $(R^1)_nSi(X^1)_{4-n}$ (where n is an integer of 0 to 3, $R^1$ is an alkyl group or phenyl group, the plurality of $R^1$ able to be different when n=2 or 3, $X^1$ being an alkoxy group expressed by Cl or $O(R^2)$, where $R^2$ is an alkyl group, and the plurality of $R^2$ able to be different when n=0, 1, or 2), a modified silicone polymer sol comprised of a solution including a compound produced by a hydrolysis reaction and dehydration condensation reaction of one or more types of substances expressed by $(R^3)_nSi(x^2)_{4-n}$ (where n is an integer of 0 to 3, $R^3$ is an organic functional group other than an alkyl group or phenyl group, the plurality of $R^3$ able to be different when n=2 or 3, $X^2$ being an alkoxy group expressed by Cl or $O(R^4)$, where $R^4$ is an alkyl group, and the plurality of $R^4$ able to be different when n=0, 1, or 2), and a mixed silicone polymer sol comprised of a solution including a compound produced by a hydrolysis reaction and dehydration condensation reaction of one or more types of compounds expressed by $(R^1)_nSi(X^1)_{4-n}$ (where n is an integer of 0 to 3, $R^1$ is an alkyl group or phenyl group, the plurality of $R^1$ able to be different when n=2 or 3, $X^1$ being an alkoxy group expressed by Cl or $O(R^2)$, where $R^2$ is an alkyl group, and the plurality of $R^2$ able to be different when n=0, 1, or 2) and one or more types of substances expressed by $(R^3)_nSi(x^2)_{4-n}$ (where n is an integer of 0 to 3, $R^3$ is an organic functional group other than an alkyl group or phenyl group, the plurality of $R^3$ able to be different when n=2 or 3, $X^2$ being an alkoxy group expressed by Cl or O($R^4$), where $R^4$ is an alkyl group, and the plurality of $R^4$ able to be different when n=0, 1, or 2) for dipping and or spraying and/or brushing to obtain an average film thickness after drying and/or baking of 0.5 to 20 µm.

(16) A method of treating end faces of a core to give an insulation coating as set forth in (15), characterized in that said pure silicone polymer sol is a compound where the number of carbon atoms in the $R^1$ and $R^2$ alkyl group is not more than 4 including a compound produced by a hydrolysis reaction and partial dehydration condensation reaction of one or more substances selected from tetramethoxysilane, tetraethoxysilane, tetraisopropoxysilane, tetrabutoxysilane, monomethyltrimethoxysilane, monomethyltriethoxysilane, monomethyltriisopropoxysilane, monomethyltributoxysilane, monoethyltrimethoxysilane, monoethyltriethoxysilane, monoethyltriisopropoxysilane, monoethyltributoxysilane, dimethyldimethoxysilane, dimethyldiethoxysilane, diethyldimethoxysilane, diethyldietoxysilane, phenyltrimethoxysilane, diphenyldimethoxysilane, phenyltriethoxysilane, and diphenyldiethoxysilane and in that said modified silicone polymer sol is a solution including one or more of an acryl-modified silicone polymer, alkyd-modified silicone polymer, polyester acryl-modified silicone polymer, epoxy-modified silicone polymer, amino-modified silicone polymer, vinyl-modified silicone polymer, and fluorine-modified silicone polymer.

(17) A method of treating end faces of a core to give an insulation coating as set forth in (15) or (16), characterized in that the metal element or semimetal element M in said insulation coating other than oxygen (O), carbon (C), hydrogen (H), nitrogen (N), sulfur (S), and fluorine (F) is mainly silicon (Si) and said Si is mainly present in a form having an Si—O bond and that said M other than Si is one or more elements selected from Li, Na, K, Mg, Ca, Cr, Mn, Fe, Co, Ni, Cu, Zn, Y Ti, Zr, Nb, B, Al, Ge, Sn, P, Sb, and Bi.

(18) A method of treating end faces of a core to give an insulation coating as set forth in any one of (15) to (17), characterized in that the total weight ratio of Si, Li, Na, K, Mg, Ca, Cr, Mn, Fe, Co, Ni, Cu, Zn, Y, Ti, Zr, Nb, B, Al, Ge, Sn, P, Sb, and Bi with respect to the total weight of elements in said insulation coating other than oxygen (O), carbon (C), hydrogen (H), nitrogen (N), sulfur(S), and fluorine (F) is at least 90% and in that the weight ratio of Si with respect to the total weight of elements in said insulation coating other than O, C, H, N, and S is at least 50 wt %.

(19) A method of treating end faces of a core to give an insulation coating as set forth in any one of (15) to (18), characterized by further adding to said insulation coating treatment agent as a filler 0.1 to 50 parts by weight as solid content of one or more of inorganic oxide powder particles, an inorganic oxide colloidal substance, organic resin powder particles, and an organic resin emulsion solution with respect to 100 parts by weight worth of $SiO_2$ of pure silicone polymer sol, modified silicone polymer sol, and/or mixed silicone polymer sol.

(20) A method of treating end faces of a core to give an insulation coating as set forth in (19), characterized by using as said inorganic powder particles or colloidal substance one or more of $SiO_2$, $Al_2O_3$, $TiO_2$, $ZrO_2$, and/or composites of the same having a primary particle size of 7 to 5000 nm.

(21) A method of treating end faces of a core to give an insulation coating as set forth in (19), characterized by using as said organic resin powder particles or emulsion solution substance one or more substances selected from acryl, polystyrene, polyethylene, polypropylene, polyamide, polycarbonate, polyurethane, melamine, phenol, epoxy resin, and/or copolymers of the same having a particle size of 50 to 10,000 nm.

(22) A method of treating end faces of a core to give an insulation coating as set forth in any one of (15) to (21), characterized by, when treating the end faces of the core, treating them with at least two repeated coatings interspersed with drying at room temperature to 300° C. for at least 30 seconds.

(23) A method of treating end faces of a core to give an insulation coating as set forth in any one of (15) to (22), characterized by, when giving repeated coatings, coating an insulating coating agent to which the filler set forth in any one of (19) to (20) is added and blended by at least one coating treatment to obtain a thickness after drying of the layer including said filler of 0.2 to 10 µm and coating an insulation coating agent to which a filler is not added and blended in at least the final coating treatment to obtain an average film thickness of the total insulation coating agent of 0.5 to 20 µm.

(24) A method of treating end faces of a core to give an insulation coating as set forth in any one of (15) to (23), characterized in that said core is comprised of; non-oriented magnetic steel sheet.

(25) A method of production of a transformer core extremely superior in insulation and corrosion resistance characterized by coating the end faces or surface of a transformer core comprised of a stack of magnetic materials with a pure silicone polymer and drying it to form an insulation coating.

(26) A method of production of a transformer core extremely superior in insulation and corrosion resistance characterized by stacking magnetic materials, attaching conductors, then coating an insulation coating of an organic silicon compound and drying it to fasten the magnetic materials and conductors.

(27) A method of production of a transformer core extremely superior in insulation and corrosion resistance as set forth in (25) to (26), characterized in that the coated and dried insulation coating has an average film thickness of 2 to 100 µm and a breakdown voltage of at least 30V.

(28) A method of production of a transformer core extremely superior in insulation and corrosion resistance as set forth in any one of (25) to (27), characterized by using as the pure silicone polymer a heat curing type compound.

(29) A method of production of a transformer core extremely superior in insulation and corrosion resistance as set forth in any one of (25) to (28), characterized by performing the coating and drying treatment one or more times by at least one method of dipping, spraying, and brushing using as the pure silicone polymer one or more types of treatment agents obtained by preparing a silane expressed by the general formulas $(R^1)_n Si(X^1)_{4-n}$ (where n is an integer of 0 to 3, $R^1$ is an alkyl group or phenyl group, the plurality of $R^1$ able to be different when n=2 or 3, $X^1$ being Cl (chlorine) or an alkoxy group expressed by $(OR^2)$, where $R^2$ is an alkyl group, and the plurality of $R^2$ able to be different when n=0, 1, or 2).

(30) A method of production of a transformer core extremely superior in insulation and corrosion resistance as set forth in (29), characterized in that the pure silicone polymer contains at least 50% of $Si(OX^1)_4$ and $R^1Si(OX^2)_3$.

(31) A method of production of a transformer core extremely superior in insulation and corrosion resistance as set forth in any one of (25) to (30), characterized by adding and blending as inorganic powder particles or a colloidal substance 0.1 to 50 parts by weight of one or more of $SiO_2$, $Al_2O_3$, $TiO_2$, $ZrO_2$, and/or composites of the same with respect to 100 parts by weight worth of $SiO_2$ contained in the pure silicone polymer as an additive.

(32) A method of production of a transformer core extremely superior in insulation and corrosion resistance as set forth in many one of (25) to (31), characterized in that a drying temperature of the pure silicone polymer is not more than 200° C.

(33) A simple method of bundling magnetic members for an electromagnetic apparatus comprised of a plurality of pieces of a magnetic material, said bundling method of a magnetic member for an electromagnetic apparatus characterized by arranging and assembling said plurality of pieces of magnetic material, then coating a solution exhibiting an ability for bundling pieces of magnetic material by drying or dipping them into the solution, then drying to join them together.

(34) A simple bundling method of a magnetic member for an electromagnetic apparatus characterized by stacking a plurality of pieces of magnetic material punched to substantially the same shapes, then coating a solution exhibiting an ability for bundling pieces of magnetic material by drying or dipping them into the solution, then drying to join them together.

(35) A simple bundling method of a magnetic member for an electromagnetic apparatus as set forth in (33) or (34), characterized by using as a solution exhibiting the ability to bundle pieces of magnetic materials together by drying a solution mainly comprised of at least one type of a pure silicone polymer and modified silicone polymer.

(36) A simple bundling method of a magnetic member for an electromagnetic apparatus as set forth in any one of (33) to (35), characterized by using as the pure silicone polymer an organic silicon compound produced by a hydrolysis and partial dehydration condensation reaction of one or more substances expressed by $(R^1)_n Si(X^1)_{4-n}$ (where n is an integer of 0 to 3, $R^1$ is an alkyl group or phenyl group, the plurality of $R^1$ able to be different when n=2 or 3, $X^1$ being Cl (chlorine) or an alkoxy group expressed by $(OR^2)$ where $R^2$ is an alkyl group, and the plurality of $R^2$ able to be different when n=0, 1, or 2).

(37) A simple bundling method of a magnetic member for an electromagnetic apparatus as set forth in any one of (33) to (35), characterized by using as said modified silicone polymer one or more of an acryl-modified silicone polymer, alkyd-modified silicone polymer, polyester acryl-modified silicone polymer, epoxy-modified silicone polymer, amino-modified silicone polymer, vinyl-modified silicone polymer, and fluorine-modified silicone polymer.

(38) A method of production of a high temperature operating electrical apparatus as set forth in any one of (28) to (42), characterized by using as a solution exhibiting the ability to mutually fasten and hold adjoining members after being coated and dried between adjoining members and having the ability to fasten and bundle them even at a high temperature of over 200° C. a pure silicone polymer comprised of a compound produced by a hydrolysis and partial dehydration condensation reaction of one or more organic silicon compounds expressed by $(R^1)_n Si(X^1)_{4-n}$ (where n is an integer of 0 to 3, $R^1$ is an alkyl group or phenyl group, the plurality of $R^1$ able to be different when n=2 or 3, $X^1$ being Cl (chlorine) or an alkoxy group expressed by $(OR^2)$, where $R^2$ is an alkyl group, and the plurality of $R^2$ able to be different when n=0, 1, or 2), coating said solution on conductors or conductors and magnetic materials or dipping the conductors or conductors and magnetic materials in said solution, then drying to join together the conductors or conductors and magnetic materials while securing electrical insulation between adjoining members of the same or different type.

(39) A method of production of a high temperature operating electrical apparatus as set forth in (38), characterized by using a pure silicone polymer comprised of an organic silicon compound expressed by $(R^1)_n Si(X^1)_{4-n}$ (where n is an integer of 0 to 3, $R^1$ is an alkyl group or phenyl group, the plurality of $R^1$ able to be different when n=2 or 3, $X^1$ being Cl (chlorine) or an alkoxy group expressed by $(OR^2)$, where $R^2$ is an alkyl group, and the plurality of $R^2$ able to be different when n=0, 1, or 2), containing at least a 80% of at least an n=0, 1 organic silicon compound and having a ratio of composition of an organic silicon compound of n=0 and an organic silicon compound of n=1 of 1:20 to 4:1.

(40) A method of production of a high temperature operating electrical apparatus as set forth in any one of (38) or (39), characterized by using as a pure silicone polymer (compound) a heat curing type pure silicone polymer.

(41) A method of production of a high temperature operating electrical apparatus as set forth in any one of (38) to (40), characterized by adding as an additive to the pure silicone polymer 0.1 to 10 parts by weight of one or more of $SiO_2$, $Al_2O_3$, and $TiO_2$ having a primary particle size of 7 to 5,000 nm.

(42) A method of production of a high temperature operating electrical apparatus as set forth in any one of (38) to (41), characterized in that the thickness after drying is 2 to 100 μm.

(43) A method of production of a high temperature operating electrical apparatus as set forth in any one of (38) to (42), characterized in that the drying temperature is not more than 200° C.

BEST MODE FOR CARRYING OUT THE INVENTION

Figure 1:
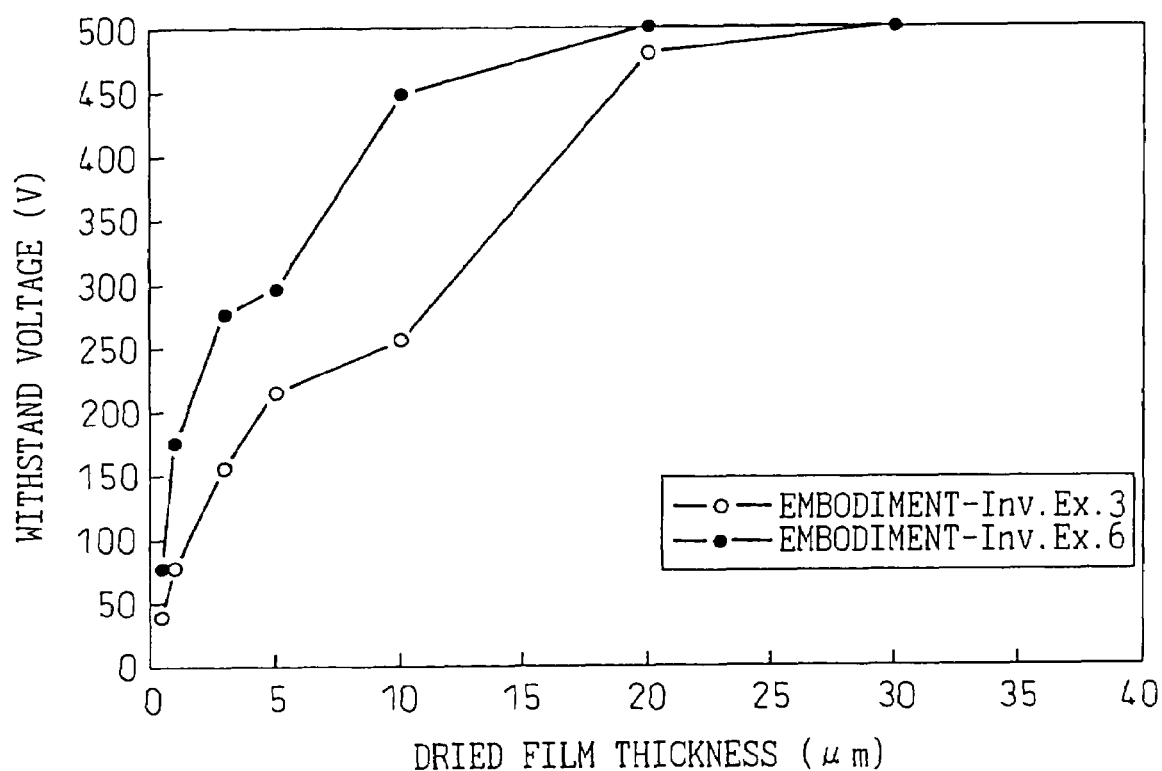
FIG. 1 is a view of the relationship between the film thickness and breakdown voltage in the case of baking while changing the thickness of deposition after drying for the solution of Invention Example 3 and Invention Example 6 in Example 1.

The core in the present invention is a core of a motor, actuator, generator, transformer, reactor, or other energy converting device, that is, a stacked core (including wire type, rod type, block type, and other cores, molded powder cores, etc.) of magnetic steel sheet (including stainless steel sheet and iron sheet used as magnetic materials).

Parts of the processed end faces and surfaces of cores are either not provided with any insulation coatings or else not provided with much coatings at all. In cores with no insulation or poor insulation on the end faces or surfaces of the cores, sometimes the members contacting the cores such as the secondary conductors of induction machines, cases fastening the cores in motors, generators, etc., bolts and other fastening members, windings, and magnets short-circuit with the cores and cause an increase in loss due to the short-circuiting current and a reduction in the torque, thrust, or output.

Further, when the end faces or surfaces of the cores have a low corrosion resistance, the end faces or surfaces easily rust. This rust damages the media and encoders and other precision sensors of recording apparatuses or cause various mechanical problems, so improvement of the corrosion resistance is important.

In the past, as measures for improving the insulation and corrosion resistance of the end faces and surfaces of cores in formation of cores using magnetic steel sheet, after punching a loop material into a core, varnishing, painting, bluing, or other heat treatment is employed.

In the prior art, however, at the time of varnishing, as pre-treatment, cleaning, annealing, etc. are necessary for removing the punching oil deposited at the time of punching and there were problems in facilities, time, and cost. Further, the bonding force, insulation, and corrosion resistance of the varnish formed were unstable and a sufficient effect hard to obtain, so at the time of varnishing, there was the problem that it was impossible to obtain the necessary thick coating or more.

Further, even with bluing, in addition to the problems of the time and cost taken for annealing, there were problems in the stability and corrosion resistance of the oxide film and in the insulation effect.

The inventors tackled the improvement of the insulation coating for different compositions of solutions, coating conditions, and drying or baking conditions. As a result, they discovered that a core having an extremely superior insulation could be obtained by using a solution comprised mainly of a silicon compound as the end face treatment agent.

A coating comprised of at least 30 parts by weight of converted $SiO_2$ is superior in insulation. In particular, the inventors succeeded in development of a core end face coating and a coating method resulting in superior appearance, adhesiveness, heat resistance, corrosion resistance, abrasion resistance, and insulation in a short time without requiring pre-treatment or high temperature drying etc. by an insulation coating comprised of a pure silicone polymer, modified silicone polymer, and/or mixed silicone polymer formed by dipping or spraying a sol mainly comprised of an organic silicon compound.

Here, "weight of converted $SiO_2$" indicates the case of making all Si present in the form of siloxane (Si—O—Si) bonds in the silicon compound the form of $SiO_2$.

Further, "purified silicone polymer" means a compound produced by a hydrolysis reaction and dehydration condensation reaction of one or more types of substances expressed by $(R^1)_n Si(X^1)_{4-n}$ (where n is an integer of 0 to 3, $R^1$ is an alkyl group or phenyl group, the plurality of $R^1$ able to be different when n=2 or 3, $X^1$ being Cl (chlorine) or an alkoxy group expressed by $(OR^2)$, where $R^2$ is an alkyl group, and the plurality of $R^2$ able to be different when n=0, 1, or 2), a "modified silicone polymer" means a compound produced by a hydrolysis reaction and dehydration condensation reaction of one or more types of substances expressed by $(R^3)_n Si(X^1)_{4-n}$ (where n is an integer of 0 to 3, $R^3$ is an organic functional group other than an alkyl group or phenyl group, the plurality of $R^3$ able to be different when n=2 or 3, $X^2$ being Cl (chlorine or an alkoxy group expressed by $(OR^4)$, where $R^4$ is an alkyl group, and the plurality of $R^4$ able to be different when n=0, 1 or 2), and a "mixed silicone polymer" means a compound produced by a hydrolysis reaction and dehydration condensation reaction of one or more types of compounds expressed by $(R^1)_n Si(X^1)_{4-n}$ (where n is an integer of 0 to 3, $R^1$ is an alkyl group or phenyl group, the plurality of $R^1$ able to be different when n=2 or 3, $X^1$ being Cl (chlorine) or an alkoxy group expressed by $(OR^2)$ where $R^2$ is an alkyl group, and the plurality of $R^2$ able to be different when n=0, 1, or 2), and one or more types of substances expressed by $(R^3)_n Si(X^2)_{4-n}$ (where n is an integer of 0 to 3, $R^3$ is an organic functional group other than an alkyl group or phenyl group, the plurality of $R^3$ able to be different when n=2 or 3, $X^2$ being Cl (chlorine) or an alkoxy group expressed by $(OR^4)$, where $R^4$ is an alkyl group, and the plurality of $R^4$ able to be different when n=0, 1, or 2).

Further, the solution states of these silicone polymers are made pure silicone polymers, modified silicone polymers, and mixed silicone-polymers.

The present invention will be explained in detail below.

The present invention is characterized by a method of treatment for giving an insulation coating to core end faces. The composition of the solution is characterized by the use of one or more types of a silicone resin, alkali silicate, colloidal silica, low melting point glass frit, a pure silicone polymer sol, a modified silicone polymer sol, and a mixed silicone polymer sol as the composition of the solution. By dipping the core material in such a solution or coating it by spraying, it is possible to form a uniform, dense coating on the exposed surfaces of the iron formed at the time of punching, that is, the core end faces or slot part.

In particular, when the silicone compound used is one or more types of a pure silicone polymer sol, modified silicone polymer sol, and mixed silicone polymer sol, the drying is finished at a low temperature in a short time and a dense film with good adhesiveness and insulation is formed on the core end faces.

It was learned that a film of in particular a pure silicone polymer among the silicone polymers formed from these sols gives a more superior heat resistance and is optimal for the production of a core including an annealing step.

Further, as a method for forming a coating at a lower temperature and shorter time, it is effective to introduce a metal or semimetal other than Si having a cross-linking action, that is, Li, Na, K, Mg, Ca, Cr, Mn, Fe, Co, Ni, Cu, Zn, Y, Ti, Zr, Nb, B, Al, Ge, Sn, P, Sb, or Bi in the form of an alkoxide or chloride dissolved in a solvent and cause a dehydration condensation reaction along with a silicone compound and thereby speed up the formation of the siloxane (Si—O—Si) bond network.

When trying to obtain a high insulation resistance or voltage resistance, corrosion resistance, or heat resistance, it is possible to add 0.1 to 50 parts by weight in terms of solid content of one or more types of inorganic oxide powder particles, an inorganic oxide colloidal substance, organic resin powder particles, and an organic resin emulsion solution per 100 parts by weight worth of $SiO_2$ of all of the silicone polymer as a filler to a silicone polymer among the above silicone compounds and thereby obtain an extremely remarkable effect of improvement of the insulation and breakdown voltage and, as a composite effect, further improve wetability power to the core end faces or steel sheet surface.

In treatment by such a coating agent, pre-treatment such as cleaning or annealing is not necessarily required as in the conventional case of using an organic varnish or inorganic insulation agent. There is the advantage that the punched core material can be directly treated to give it an insulation coating after clamping.

When coating an insulation agent solution, the ability of the solution to deposit on the core end faces is controlled by controlling the type of the solvent and the ratio, concentration, and viscosity of the solvent. The solution is coated to a predetermined thickness by controlling the pullout speed in the case of dipping and the nozzle shape, the ejection speed, etc. in the case of spraying in combination with the solution conditions. At this time, when the desired thickness cannot be obtained by a single treatment, the thickness can be obtained by coating once, drying at a low temperature, then dipping or spraying again.

The drying conditions in the case of the silicone compound of the present invention are drying and baking at a low temperature of less than 300° C. and a short time.

In particular, when using a pure silicone polymer, modified silicone polymer, or mixed silicone polymer obtained using silane as a stock material, it is sufficient to dry at room temperature to 120° C. or so. In particular, when using a modified silicone polymer or mixed silicone polymer, low temperature and short time drying becomes possible by the action of the modified functional groups. When requiring short time drying, in the same way as using a silicone compound, extremely fast treatment of the core end faces becomes possible by drying at a temperature of up to 300° C. or so.

Next, the reasons for the limitations of the present invention will be explained.

First, the reasons for limitation of the core material having a high insulation will be explained.

The core of the present invention is characterized by having a coating having an average film thickness of at least 0.5 µm and containing at least 30 parts by weight of a silicon compound in the coating converted to $SiO_2$.

The reason why the average film thickness of the coating of the core end faces was made at least 0.5 µm is that it is necessary to obtain an effect of improvement of the insulation and corrosion resistance. With an average film thickness of less than 0.5 µm, sufficient insulation and corrosion resistance cannot be obtained if locally thin portions of the coating occur.

Further, the reason why it is necessary to include at least 30 parts by weight of a silicon compound in the coating as $SiO_2$ is that this is important for the density, insulation, and heat resistance of the coating. In particular, it is preferable to include it in an amount of at least 50 parts by weight, more preferably at least 75 parts by weight, to improve the insulation and the heat resistance.

Another characteristic is that the silicon compound is comprised of one or more types of an alkali silicate, colloidal silica, low melting point glass frit, pure silicone polymer, modified silicone polymer, and mixed silicone polymer.

When treating surfaces by these silicon compounds and drying them, the insulation coating is dense and a uniform coating is formed. The alkali silicate used is one or more types of compounds expressed by $M_2O \cdot nSiO_2 \cdot mH_2O$ (M: Li Na, K, n: 1 to 4) such as sodium silicate.

A core having an organic silicon compound coating called, in particular, a pure silicone polymer, modified silicone polymer, or mixed silicone polymer among these silicone compounds, features a dense coating with abundant uniformity and giving superior performance in corrosion resistance and insulation. In particular, in the case of a core having a pure silicone polymer coating, there is the advantage of superior heat resistance at a higher temperature.

As the most preferable insulation coating condition, there is an insulation coating comprised of a dry film of a pure silicone polymer, modified silicone polymer, and/or mixed silicone polymer among the above silicone compounds, having an average thickness of at least 2.0 µm, preferably 2.5 to 20 µm on the core end faces, and having a breakdown voltage of at least 30V.

A core changes in the shape and roughness of its end faces depending on the conditions of the cutting or punching of the material. If at least 2.0 µm in thickness, any variation is absorbed and stable insulation is obtained. If the thickness is too thick, cost problems or problems such as reduction of the adhesiveness of the insulation coating arise.

Another feature of the core of the present invention is that the heat resistance is at least 400° C. The "heat resistance" referred to in the present invention means the adhesiveness and insulation properties not being impaired when annealing at that temperature when using in particular a pure silicone polymer sol among the treatment agents used in the present invention, the heat resistance is superior. This makes it suitable at the time of Al diecasting or Cu diecasting of the core.

Further, in the case of this silicone polymer sol, a heat curing type of silicone polymer sol is a more preferable treatment agent. This is because in the case of a heat curing type, there is the advantage that the solution seeping between the steel sheets in the dipping or other coating process can be dried in a short time at the time of heating and drying.

The inventors investigated the insulation of motor cores and the efficiency of cores and discovered that by improvement of the insulation of the core end faces had the effect of improvement of the electrical insulation with the members contacting a core, suppressed the short-circuiting current between sheets causing an increase in loss and drop in output, and increased the motor torque (thrust) and output.

For example, in a high speed induction motor (180,000 rpm, two poles), with a secondary conductor interval in the rotating core of 2 cm, a core height (stacked height of magnetic steel sheets) of 50 cm, and core excitation magnetic flux of 1 T, a breakdown voltage of at least 34V (reference: 180,000 rpm/60 s=3 kHz, $\sqrt{2}\hat{\sigma}\times 3{,}000\times 0.02$ m×0.5 m/2×1 T× two end faces=33.3V) becomes necessary. Therefore, in practice, at least 50V becomes necessary.

The coating obtained by the pure silicone polymer, modified silicon polymer, and mixed silicone polymer of the present invention forms a dense insulation coating of a superior adhesiveness comprised mainly of $SiO_2$ by curing in a layer shape or three-dimensional shape by low temperature drying in a short time in the process of removal of the alcohol or other solvent contained in the solution.

Since a breakdown voltage of at least 30V is obtained if making the film thickness after drying at least 0.5 µm by the insulation coating formed in this way, the lower limit of the average film thickness is made 0.5 µm.

If the film thickness is more than 20 µm, however, depending on the drying or baking conditions, the adhesiveness of the coating after the treatment falls, cracks occur. In particular, when subjected to heat treatment, bonding defects sometimes occur. Further, a long time is taken for drying, which leads to cost increases, so the thickness is limited.

The insulation coating used is one or more types of a pure silicone polymer, modified silicone polymer, or mixed silicone polymer. The pure silicone polymer sol is produced, for example, by hydrolysis reaction and partial dehydration condensation without a solvent or in an inorganic solvent of one or more types of substances expressed by $(R^1)_n Si(X^1)_{4-n}$ (where n is an integer of 0 to 3, $R^1$ is an alkyl group or phenyl group, the plurality of $R^1$ able to be different when n=2 or 3, $X^1$ being an alkoxy group expressed by Cl or $O(R^2)$, where $R^2$ is an alkyl group, and the plurality of $R^2$ able to be different when n=0, 1, or 2).

At this time, it is possible to change the type of the stock silane monomer used so as to impart various types of performance to a coating formed from the sol.

Further, the inventors used pure silicone polymer for repeated massive experiments and studies on the conditions for obtaining a thick film with good insulation and heat resistance and as a result found out that use of a so-called four-function or three-function silicone polymer of the composition of the above general formula where n=0 or 1 is overwhelmingly advantageous when a heat treatment step is included.

In particular, by combining the n=1 component in a range of 20 to 80% in the combination of n=0 and 1, a thick insulation coating extremely superior in appearance, insulation, heat resistance, and adhesiveness becomes possible.

A modified silicone polymer is a stock monomer of a pure silicone polymer modified by an organic resin other than an alkyl group or phenyl group. As the method of modification, the polymer is modified by a known cold blend or condensation reaction etc.

A mixed silicone polymer is produced by hydrolysis and dehydration condensation of a stock monomer forming a pure silicone polymer and a stock monomer forming a modified silicone polymer in desired proportions. The pure silicone polymer component and the modified silicone polymer component are networked at the molecular level.

The stock material of the sol for obtaining a pure silicone polymer used is one or more types of C4 or less alkyl group tetramethoxysilane, tetraethoxy-silane, tetraisopropoxysilane, tetrabutoxysilane, monomethyltrimethoxysilane, monomethyltriethoxysilane, monomethyltriiso-propoxysilane, monomethyltributoxysilane, monoethyltrimethoxysilane, monoethyltriethoxysilane, monoethyltriisopropoxysilane, monoethyltributoxysilane, dimethyldimethoxysilane, dimethyldiethoxysilane, diethyldimethoxysilane, diethyldietoxysilane, phenyltrimethoxysilane, diphenyldimethoxysilane, phenyltriethoxysilane, and diphenyldiethoxysilane and further silane tetrachloride, titanium methyl trichloride, etc. as silane chlorides.

The introduction of the alkyl group or phenyl group enables flexibility and processability to be imparted to the coating and enables a better heat resistance to be exhibited compared with other organic functional groups.

However, along with an increase in the number of carbon atoms of the alkyl group, the heat resistance falls, the film-formability falls, the drying temperature becomes higher, and other problems arise, so not more than four carbon atoms is desirable. In particular, when considering heat resistance of 500 to 600° C. or so, not more than one carbon atom is desirable.

As the modified silicone polymer, for example, use is made of one or more of an acryl-modified silicone polymer, alkyd-modified silicone polymer, polyester acryl-modified silicone polymer, epoxy-modified silicone polymer, amino-modified silicone polymer, vinyl-modified silicone polymer, and fluorine-modified silicone polymer. These modified silicone polymers give rise to bonds between organic functional groups other than Si—O—Si bonds as well, so a dense insulation coating is obtained at a low temperature.

The mixed silicone polymer is formed by using one or more of each of a stock monomer for obtaining the above pure silicone polymer and stock monomer of a modified silicone polymer. This polymer enables achievement of both of the heat resistance etc. of a pure silicone polymer and the low temperature curability, water repellency, and other functions of a modified silicone polymer at the molecular level.

Further, it is possible to introduce to any of these silicone polymers another metal oxide as the catalyst or cross-linking point for promoting the condensation reaction. As metal alkoxides of the stock material at this time, there are titanium tetraethoxide, titanium isopropoxide, aluminum butoxide, etc.

An insulation coating comprised of such silicone polymers forms a dense, strong coating mainly comprised of $SiO_2$ by an extremely fast drying step where desolvation and dehydration occur simultaneously. Therefore, the insulation coating formed is dense and has corrosion-resistance and is resistant to compression stress. This is advantageous when performing various processing in later steps.

Further, when the organic group is an alkyl group such as a methyl group, a phenyl group, or a group including fluorine such as a $CH_3$ group, there is water repellency and a more superior corrosion resistance is obtained, so this contributes to improvement of the corrosion resistance.

Each of these silicone polymers gives a better coating than the prior art, but in the case of a pure silicone polymer, a more dense coating with a good insulation, heat resistance, and adhesiveness is obtained, while in the case of a modified silicone polymer or mixed silicone polymer, a slightly inferior tendency is exhibited compared with the former case in insulation, film strength, corrosion resistance, heat resistance, etc. due to the organic resin component contained.

Further, the advantage in the case where the metal element or semimetal element M other than oxygen, carbon, hydrogen, and nitrogen is mainly silicon (Si), said Si is mainly present in a form having an Si—O bond, and said M other than silicon contains one or more elements selected from Li, Na, K, Mg, Ca, Cr, Mn, Fe, Co, Ni, Cu, Zn, Y Ti, Zr, Nb, B, Al, Ge, Sn, P, Sb, and Bi as preferable conditions for the above insulation coating are due to the following:

To impart insulation, the insulation coating is preferably a dense amorphous structure. Therefore, it is necessary to make an Si—O—Si network structure having an amorphous structure up to a relatively high temperature the basic skeleton of the coating matrix.

In the method of forming a coating from a solution (sol), however, there is a problem of peeling of the coating due to shrinkage occurring at the time of desolvation or condensation.

As a measure to solve this, there is the method of dispersing a stable oxide in a solvent and introducing it into the coating. There is an advantage to addition of an oxide or composite oxide of a metal or semimetal other than Si suitable for the solvent.

Further, a condensation reaction of Si—O—Si has the defect of a generally low reactivity. To improve this reactivity, a metal or semimetal catalyst is added or M-O bonds of a metal or semimetal (M) other than Si forming a cross-linking point of an Si—O—Si network are introduced by using an alkoxide or acetyl acetate complex or chloride of M. A dense film including M is formed in a short time. As a result, the coating including M gives a dense insulation coating with few cracks.

Next, the reason for making the total weight ratio of Si, Li, Na, K, Mg, Ca, Cr, Mn, Fe, Co, Ni, Cu, Zn, Y, Ti, Zr, Nb, B, Al, Ge, Sn, P, Sb, and Bi in the insulation coating with respect to the total weight of elements in said insulation coating other than oxygen, carbon, hydrogen, nitrogen, sulfur, and fluorine at least 90 parts by weight and making the weight ratio of Si with respect to the total weight of elements in said insulation coating other than oxygen, carbon, hydrogen, nitrogen, sulfur, and fluorine at least 50 parts by weight is as follows:

A high insulation is basically held by the insulating oxide in the coating. Therefore, the ratio of the component metal of the insulating oxide, that is, Si, Li, Na, K, Mg, Ca, Y, Ti, Zr, Nb, B, Al, Ge, Sn, P, Sb, and Bi, is preferably at least 90 parts by weight, more preferably at least 95 parts by weight, in all components other than the oxygen, carbon, hydrogen, nitrogen, sulfur, and fluorine contained in the organic functional group introduced for the purpose of imparting processability, water repellency, etc. and further other than the oxygen for limiting the metal component.

Among these, as mentioned above, the matrix structure of the coating contributes greatly to the Si—O—Si network. In the insulation coating, the weight ratio of the basic skeletal component, that is, Si, has to be at least 50 parts of the total weight of the elements other than oxygen, carbon, hydrogen, nitrogen, sulfur, and fluorine and preferably is at least 75 parts by weight from the viewpoint of the improvement of the insulation and the improvement of the coating strength.

In applying the present invention, it is advantageous to use as the core material in particular a non-oriented magnetic steel sheet and use it for insulation of the end faces at the time of assembly of the core. That is, in the core material of a motor core etc., in almost all cases, the stacked core is treated to prevent rust or is either or both annealed or treated with an organic varnish for insulation. The effects of this are tremendous.

Next, in the method of production of a core using the present invention, in the step of processing the core, the non-oriented magnetic steel sheet core is punched, stacked, clamped, and, in accordance with need, treated to prevent rust or for insulation etc. The technology of the present invention enables a simple, low cost, and high productivity non-oriented magnetic steel sheet core having a superior coating performance to be easily obtained.

As the silicone compound used as a component of the insulation coating agent, the core is treated by one or more of a silicone resin, alkali silicate, colloidal silica, low melting point glass frit, pure silicone polymer sol, modified silicone polymer sol, and mixed silicone polymer sol.

The core is characterized by being produced to give an average thickness of the insulation coating of 0.5 μm to 20 μm. When treating it by such a silicon compound and drying it, the insulation coating is formed dense and uniform as a coating.

In particular, when using a pure silicone polymer sol, modified silicone polymer sol, and mixed silicone polymer sol comprised of an organic silicon compound, no cleaning, annealing, or other pre-treatment is needed in the treatment by the insulation coating agent, so this is effective in reduction of the cost of industrial treatment.

Further, the insulation coating is dense and uniform and superior in corrosion resistance and insulation. Further, in the case of a pure silicone polymer, there is the advantage of superiority in heat resistance at a higher temperature. This is advantageous in the case of including an annealing, aluminum diecasting, or other heat treatment step.

In the case of such a coating of the present invention, when the average film thickness is less than 0.5 μm, a sufficient effect of improvement of the insulation and corrosion resistance cannot be obtained. On the other hand, with a film thickness of more than 20 μm, locally thick portions occur and the stacked thickness of the core increases or the adhesiveness deteriorates. In particular, this is set as a limit since when including an annealing step, local peeling or detachment of the insulation coating easily occurs.

For coating these, there are the methods of dipping, spraying, etc., but dipping is advantageous if considering the simplicity of the facilities and efficiency of use of the solution.

The coating agent characterizing the present invention features, in terms of the composition of the solution, the use of one or more of a pure silicone polymer sol, modified silicone polymer sol, and mixed silicone polymer sol.

A pure silicone polymer sol is produced by hydrolysis and partial dehydration condensation without a solvent or in an organic solvent of one or more types of known substances expressed by $(R^1)_n Si(X^1)_{4-n}$ (where n is an integer of 0 to 3, $R^1$ is an alkyl group or phenyl group, the plurality of $R^1$ able to be different when n=2 or 3, $X^1$ being an alkoxy group expressed by Cl or $O(R^2)$, where $R^2$ is an alkyl group, and the plurality of $R^2$ able to be different when n=0, 1, or 2) and held in the sol state.

A modified silicone polymer sol is a solution of a compound obtained by hydrolysis and partial dehydration condensation of the stock monomer of a pure silicone polymer sol modified by an organic resin other than an alkyl group or phenyl group. The method of modification is known modification by cold blending, a condensation reaction, etc.

A mixed silicone polymer sol is produced by hydrolysis and dehydration condensation of a stock monomer forming a pure silicone polymer sol and a stock monomer forming a modified silicone polymer sol in a desired ratio and is structured with the pure silicone polymer sol component and modified silicone polymer sol component networked on the molecular level.

Further, these coating agents may be made into sols giving O-M-O—Si bonds by causing hydrolysis and partial dehydration condensation of a metal or semimetal (M) other than Si as an alkoxide or chloride.

The stock material of the pure silicone polymer sol used is one or more of types of C4 or less alkyl group tetramethoxysilane, tetraethoxysilane, tetraisopropoxysilane, tetrabutoxysilane, monomethyltrimethoxysilane, monomethyltriethoxysilane, monomethyltriisopropoxysilane, monomethyltributoxysilane, monoethyltrimethoxysilane, monoethyltriethoxysilane, monoethyltriisopropoxysilane, monoethyltributoxysilane, dimethyldimethoxysilane, dimethyldiethoxysilane, diethyldimethoxysilane, diethyldietoxysilane, phenyltrimethoxysilane, diphenyldimethoxysilane, phenyltriethoxysilane, and diphenyldiethoxysilane and further silane tetrachloride, titanium methyl trichloride, etc. as silane chlorides.

The modified silicone polymer sol used is for example one or more of an acryl-modified silicone polymer, alkyd-modified silicone polymer, polyester acryl-modified silicone polymer, epoxy-modified silicone polymer, amino-modified silicone polymer, vinyl-modified silicone polymer, and fluorine-modified silicone polymer. These are used suitably diluted by water and/or alcohol or another solvent.

In particular, a modified silicone polymer having a polar functional group is effective operation wise in that it does not require alcohol as a solvent. Further, with a modified silicone polymer, bonds between organic functional groups other than Si—O—Si bonds occur. This is effective for forming a dense insulation coating at a low temperature.

As the mixed silicone polymer, one or more of each of a stock monomer for obtaining the above pure silicone polymer and stock monomer of a modified silicone polymer is used. Further, as the metal alkoxide used as a cross-linking point of the matrix, there is titanium tetraethoxide, titanium isopropoxide, aluminum butoxide, etc.

The solution for treating the core end faces, surface, etc. with these silicone polymers performs desolvation and dehydration simultaneously, so dries extremely fast and forms a dense, coating mainly comprised of Si—O structure. Further, the insulation coating formed is dense, has corrosion resistance, and is resistant to compression stress. It is advantageous when performing various processing in later steps.

When using these silicone polymer sols and the film thickness after drying and/or baking is 0.5 to 20 μm, the adhesiveness is excellent and an insulation treatment of core end faces superior in insulation, breakdown voltage, corrosion resistance, and heat resistance can be achieved. In particular, with a pure silicone polymer, an insulation coating more superior in heat resistance is obtained.

In particular, when using one or more of tetraethoxysilane, tetramethoxysilane, methyltriethoxysilane, methyltrimethoxysilane, etc., a superior heat resistance is obtained. On the other hand, in the case of said modified silicone polymer or mixed silicone polymer, there is a tendency exhibited for the heat resistance to deteriorate, so this is suited for applications where no annealing is performed.

By adding as a filler to a coating solution using one or more of a pure silicone polymer sol, modified silicone polymer sol, and mixed silicone polymer sol one or more of inorganic powder particles, organic resin powder particles, and/or emulsion solutions or colloidal solutions of the same in an amount, in solid content, of 0.1 to 50 parts by weight with respect to 100 parts by weight worth of $SiO_2$ of the pure silicone polymer sol, modified silicone polymer sol, and mixed silicone polymer sol, an extremely remarkable effect of improvement of the insulation and breakdown voltage is achieved and further, as a composite effect, the deposition power on the core end faces or steel sheet surface is improved.

Further, by reducing the shrinkage at the time of drying, it is possible to easily suppress cracking and increase the thickness.

As the filler added at this time, in the case of an inorganic substance, 0.1 to 50 parts by weight of one or more of the substances selected from $SiO_2$, $Al_2O_3$, $TiO_2$, $ZrO_2$, and composites of the same having a primary particle size of 7 to 5000 nm is added and blended as powder particles or colloidal substances.

In the case of an organic substance, addition and blending of 0.1 to 50 parts by weight of one or more substances selected from acryl, polystyrene, polyethylene, polypropylene, polyamide, polycarbonate, polyurethane, melamine, phenol, epoxy resin, and copolymers of the same of a particle size of 50 to 10,000 nm as an emulsion substance is effective for improvement of the insulation.

With an amount of addition of less than 0.1 part by weight with respect to 100 parts by weight worth of $SiO_2$ of all of the silicone polymer, the effect of improvement of the insulation and adhesiveness is weak. On the other hand, if over 50 parts by weight, the breakdown voltage of the coating is improved more, but the density of the film is impaired or the lifetime of the solution reduced, so this is set as a limit.

As the filler, in the case of an inorganic oxide, a powder or colloidal substance of $SiO_2$, $Al_2O_3$, $TiO_2$, $ZrO_2$, or a composite of the same is advantageous since it is low in cost and gives an effect of improvement of the insulation due to the good dispersion and addition.

In the case of an organic type, one or more powders or emulsions etc. selected from acryl, polystyrene, polyethylene, polypropylene, polyamide, polycarbonate, polyurethane, melamine, phenol, and epoxy resins in suitable combination is used.

If considering all together the solution stability, hardness, insulation effect, heat resistance, etc. in the case of addition, an inorganic additive is advantageous in that it is lower in cost and gives excellent dispersion and a stable effect of improvement of the insulation and adhesiveness. In particular, the effect is remarkable when performing strain annealing or another heat treatment step.

The particle size of the filler is important. In the case of an inorganic type filler, when the particle size is less than 7 nm, when dispersed in the solution, the cohesiveness becomes stronger and the coating thickness becomes uneven or there is an effect on the pH of the solution and the stability of the solution deteriorates, so this is set as a limit.

On the other hand, when over 5,000 nm, the surface roughness due to the coarse particles becomes too great and the inorganic substance is liable to detach from the core end faces due to abrasion etc., so this is set as a limit. If in this range, the adhesiveness is good with a balance between the film thickness and amount of addition and an insulation coating having a high breakdown voltage can be formed. This is set as a limit for the same reasons as in the case of an organic type filler.

When adding an additive to the silicone polymer, a more uniform dispersion is desirable. If the powder substance is added after being dispersed in an alcohol or other solvent, a superior effect of dispersion is obtained. This is advantageous for obtaining a coating of a uniform thickness. In particular, a uniform dispersion is obtained if jointly using dispersion by ultrasonic vibration or dispersion by another mixer etc.

When drying the core after being coated with a solution, drying at ordinary temperature is sufficient, but when trying to dry in a short time or improve the efficiency of the process, if drying in a drying furnace at a temperature of not more than 300° C. for at least 30 seconds, the desolvation and dehydration condensation proceed sufficiently and a good coating performance is obtained. As a preferable drying method, gradual heating gives good coating properties.

This is because if heating rapidly, water, alcohol, or another solvent is rapidly dried and bump like surface defects easily occur.

When using the solution of the present invention for repeated coating to try to obtain a thick coating, to obtain a thicker coating and good insulation performance, it is advantageous to first coat and dry a solution containing the filler at a low temperature of room temperature to 120° C., then coat and dry a solution not containing a filler.

At the time of repeated coating, it is sufficient to coat the coating agent containing the filler to give an average film thickness after drying of 0.2 to 10 μm and then coat a solution not containing a filler to give 0.5 to 20 μm after drying.

The treatment with reduced content of filler is due to the fact that a combination of coating a large amount of an agent without a filler to flatten the roughness due to the filler makes it easy to obtain an insulation coating providing high insulation, uniformity, adhesiveness, and corrosion resistance.

Next, the reasons for limitation in a transformer core having a high insulation will be explained.

The stacked sheets of the magnetic material in the present invention are treated on their end faces and surfaces with an insulation coating comprised of an organic silicon compound and feature superior insulation and corrosion resistance. The coating component of the organic silicon compound used in the present invention has Si—O bonds and forms an extremely dense coating mainly comprised of an $SiO_2$ component. Therefore, it is possible to form an insulation coating with an extremely superior insulation and corrosion resistance.

The thickness of the insulation coating of the present invention is made 2 to 100 μm. With a thickness of over 2 μm, the breakdown voltage becomes 40V, which is sufficient for a small-sized transformer. If the thickness is less than 2 μm, depending on the shape of the end faces of the core, locally thin portions occur and a stable breakdown voltage cannot be obtained. On the other hand, if the thickness becomes more than 50 μm, a close to infinite breakdown voltage is obtained. There is no problem even when a high breakdown voltage is required as in the case of a large-sized transformer. For the upper limit, the coating may be thick, but considering dryability, repeated coating, and adhesiveness of the insulation coating at the time of actual work, the limit of the maximum thickness is made 100 μm. Considering the ease of the coating treatment, the coating performance, the cost, etc., the most preferable range is 3 to 30 μm.

Further, the transformer core of the present invention means a transformer core where only the stacked core is treated to give insulation and one where a conductor is attached to the stacked core, then they are simultaneously given an insulation coating. In the latter case, since the stacked core and conductor material are simultaneously treated to give an insulation coating, not only insulation, but also bonding of the core and conductor are simultaneously achieved. The insulation coating material permeates to the core end faces, surface, between the steel sheets (foil), between the conductors, and the interface between the core and conductors. With a dry film, not only are an extremely superior insulation and corrosion resistance obtained, but also the stacked core material, the conductors themselves, and the core and conductors are strongly bonded. With an organic silicon compound coating of the present invention, a superior insulating and bonded coating provided with hardness, strength, heat resistance, etc. is obtained depending on the composition.

Next, using as the composition of the solution of the organic silicon compound used in the present invention one or more types of treatment agents obtained by preparing a silane expressed by the general formulas; $(R^1)_n Si(X^1)_{4-n}$ (where n is an integer of 0 to 3, $R^1$ is an alkyl group or phenyl group, the plurality of $R^1$ able to be different when n=2 or 3, $X^1$ being an alkoxy group expressed by Cl or $O(R^2)$, where $R^2$ is an alkyl group, and the plurality of $R^2$ able to be different when n=0, 1, or 2), the end faces and surface are coated and dried one or more times by at least one of dipping, spraying, and brushing interspaced with drying. The organic silicon compound is produced by hydrolysis and polymerization of a known alkoxysilane without a solvent or in an organic solvent. At this time, by changing the type or combination of silanes used, coatings having various types of performance can be obtained.

When producing a partially hydrolyzed product of alkoxysilane as the organic silicon compound, use is made of one or more of tetramethoxysilane, tetraethoxysilane, tetraisopropoxysilane, tetrabutoxysilane, monomethyltrimethoxysilane, monomethyltriethoxysilane, monomethyltriisopropoxy-silane, monomethyltributoxysilane, monoethyltrimethoxysilane, monoethyltriethoxysilane, monoethyltriisopropoxysilane, monoethyltributoxy-silane, dimethyldimethoxysilane, dimethyldiethoxy-silane, diethyldimethoxysilane, diethyldietoxysilane, phenyltrimethoxysilane, diphenyldimethoxysilane, phenyltriethoxysilane, and diphenyldiethoxysilane. At that time, as more preferable conditions, if preparing the stock material so that the coating agent contains at least 50% of one or more types of substances expressed by $(R^1)_n Si(X^1)_{4-n}$ (where n is an integer of 0 to 3, $R^1$ is an alkyl group or phenyl group, the plurality of $R^1$ able to be different when n=2 or 3, $X^1$ being an alkoxy group expressed by Cl or $O(R^2)$, where $R^2$ is an alkyl group, and the plurality of $R^2$ able to be different when n=0, 1, or 2), a coating superior in insulation, corrosion resistance, adhesiveness, and heat resistance is obtained. When the content is smaller than this, the heat resistance tends to fall and, depending on the heating conditions, peeling of the film occurs. Most preferable is when the agent contains at least 50% of $R^1$, and at least 5% of $X^1$. In this case, a thick coating superior in adhesiveness and heat resistance is obtained.

As the organic silicon compound, depending on the method of production, there is a heat curing type treatment agent which gives a partial hydrolyzed product of a silane compound as a reaction in the curing process, then is used for treatment and is cured by evaporating the alcohol of the solvent component or moisture by heat and a moisture curing type which does not undergo partial hydrolysis in the process of production of the organic silicon compound, but is given a curing agent, is used for treatment, then cures by undergoing a hydrolysis and condensation reaction by the moisture in the air. In the case of the present invention, the insulation coating treatment, bundling, and bonding not only of the end faces of the steel sheets, but also between the steel sheets (foil), the spaces between the conductors, and between the steel sheets (foil) and conductors are important. As a more preferable condition, use of a heat curing type of solution is advantageous for obtaining quick drying and properties of a stable insulation coating.

By coating and drying at a low temperature one or more types of organic silicon compounds comprised of a partial condensate obtained from silane, it is possible to form an $SiO_2$ polymer film superior in coating performance.

Further, when trying to obtain a high insulation resistance or breakdown voltage in the bundling film, 0.1 to 50 parts by weight in terms of solid content of inorganic oxide powder particles or colloidal solution is added as a filler to the organic silicon compound with respect to 100 parts by weight worth of $SiO_2$ contained in the organic silicon compound. As a composite effect of addition of the filler, the deposition power on the core end faces or steel sheet (foil) surface and crack resistance and insulation of the coating are improved. As the inorganic powder particles or colloidal substance added, 0.1 to 50 parts by weight of one or more types of substances selected from $SiO_2$, $Al_2O_3$, $TiO_2$, $ZrO_2$, and/or composite substances of the same having a primary particle size of 7 to 5000 nm is added. If the amount of addition is less than 0.1 part by weight, an effect of improvement of wetability, cracking resistance, and insulation is not obtained. Further, if over 20 parts by weight, poor bundability and adhesiveness and film unevenness easily occur. The best range of addition is 0.4 to 2 parts by weight.

The method of coating the above organic silicon compound may be the generally used method of applying a surface coating, painting etc. The method of not only spray coating and dipping, but also brushing may be used. It is also possible to use general methods for suppressing unevenness of the amount of coating etc. Further, to improve the bonding power of the contact parts of the conductors, magnetic materials, etc., it is possible to secure bundling power after drying if giving clearance once at the contact parts, impregnating the bundling solution in the contact parts, and then establishing a predetermined contact state.

The dried thickness is easy to control by the method of changing the type of the solvent of the solution or the concentration or viscosity of the solvent. If performing the coating and drying step several times, it is possible to increase the film thickness by that amount. The coating is applied to a predetermined thickness by controlling the pullout speed in the case of dipping and the nozzle shape, ejection speed, etc. together with the above solution conditions in the case of spraying. Further, it is possible to suppress solution buildup and adjust the film thickness by blowing compressed air.

The electrical insulation coating formed in the present invention also has a bundling function. Further, it also serves as a rust preventing film. That is, it is possible to coat only the core end faces or possible to attach the winding and then coat the winding to fasten it. The dried film of the present invention is mainly comprised of $SiO_2$ and forms a dense film having Si—O bonds, so exhibits an extremely superior insulation and rust prevention function.

When using the organic silicon compound of the present invention, the drying temperature should be not more than 200° C. This is because the solvent making up part of the organic silicon compound is mainly methyl alcohol, ethyl alcohol, butyl alcohol, propyl alcohol, water, or another low temperature volatilizing solvent. The preferable drying temperature is 80 to 120° C. By using a low boiling point solvent, this drying temperature becomes possible. If in this temperature range, drying in a short time of several minutes becomes possible.

In a large-sized, medium-sized, and small-sized transformer for power use, the flow of a short-circuiting current itself is a serious problem and must not be allowed. The present invention also takes note of the problems in work efficiency, cost, and the work environment caused by the varnishing and other treatment conventionally performed after deburring and other treatment of the end faces of core materials. If the organic silicon compound of the present invention is used, properties (functions) above those of varnishing are secured and these problems are alleviated.

As the electrical apparatuses in the present invention, there are electromagnetic apparatuses and heaters. The electromagnetic apparatuses include motors, actuators, generators, transformers, reactors, etc. The heaters uses induction heating, heating by irradiation by infrared rays or other light and electromagnetic waves, and heating by direct conduction. The application and model are irrelevant.

The motors, actuators, and generators come in an induction machine type, synchronous machine type, DC machine type, reactance type, or two or more types in combination and include large-sized to micro motors. Further, transformers include wound transformers, stacked transformers, and other types using various types of cores. Reactors are used for inverters, converters, choppers, apparatuses used for adjusting the phase of the voltage and current and improving the power factor, filters for eliminating high frequencies etc., ignitions, etc. There are wound types, stacked types, types with clearances and types without, saturatable types, types used not allowing saturation, types using cut cores, etc. Types having cores or yokes and types not having them are both possible. Further, types having permanent magnets and types not having them are both possible.

The core and yoke include magnetic steel sheet, permalloy metal, iron-cobalt alloy, amorphous magnetic material core, and other stacked cores, soft ferrite cores, cast cores, powder metallurgical cores, plastic formed cores of powder, etc. The materials of the core and yoke include magnetic steel sheet, plate, and other ferrous metals or ferrous metal alloys, nickel, permalloy metal, and other nickel alloys, cobalt and cobalt alloys, and soft ferrite, amorphous materials, nanocrystal materials, etc. The applications include armature cores, field yokes, transformer cores, reactor cores, electromagnet cores, printed circuit boards, etc. In particular, much use is made of cores and yokes obtained by punching and stacking magnetic steel sheet. Cores include cores obtained by punching and stacking single pieces, cores using combinations of divided core pieces, and wound cores sometimes used for axial gap type rotary machines such as in rotary machines, plastic deformed cores such as claw pole cores, wound cores, stacked cores, sintered cores, powder molded cores, plastic formed cores, etc. such as in transformers or reactors, cut cores, EI cores, etc. The present invention can be applied to all of these.

The permanent magnets are not limited in type or shape and are not only used for fields for motors, actuators, and generators, but are also used for the bias magnetic flux (magnetic field) used in flyback transformers and reactors.

Electromagnetic apparatus, as explained above, use numerous magnetic members such as armature cores, permanent magnets, field yokes, etc. Even armature cores, field yokes, etc. are often comprised from a plurality of pieces of magnetic materials such as in the stacking of magnetic steel sheet.

Electromagnetic apparatuses are sometimes magnetically shielded or electromagnetically shielded so as to prevent magnetic flux from leaking to the outside or to prevent external magnetic flux from invading the apparatus and having a detrimental effect on the outside or inside of the apparatus. The magnetic members of the present invention include magnetic members for magnetic shielding and electromagnetic shielding. In this case, the electromagnetic apparatuses to which the present invention relates include apparatuses, devices, and facilities generating magnetic flux and electromagnetic waves and conversely includes apparatuses, devices, and facilities affected by magnetic flux and electromagnetic waves. Further, the invention can also be applied to general magnetic shielding materials and electromagnetic shielding materials.

Electrical apparatuses use conductors. The conductors of electromagnetic apparatuses carry armature current or carry current generating a field magnetic flux. They may be provided at the stator side or provided at the rotor or moving piece side. The secondary conductors carrying the induction current such as in induction machines, the short rings used for voice coil motors, etc. are also included as conductors. The conductors of the heaters are heating elements etc. Further, the lead wires and wirings used in electrical apparatuses are included in the conductors of the present invention.

The high temperature operating electrical apparatuses of the present invention include ones used at a high temperature and used at high temperature environments and ones which become high in temperature by the heat generated from the conductors or magnetic materials. Therefore, the electrical insulation and magnetic flux retention of the conductors or magnetic materials have to be able to breakdown even high temperatures. The heat resistance temperature of the insulation coating or adhesive applied to conventional conductors was normally the 180° C. of the H type of the JIS (Japan Industrial Standard) at the maximum. In the present invention, the "high temperature" means a temperature range of from 200° C. to 900° C. inclusive. If the temperature becomes higher than 900° C., mechanical problems arise in the conductors themselves. According to the present invention, it becomes possible to provide an electrical apparatus able to operate even at such a temperature.

In the present invention, a solution exhibiting the ability to fasten and bundle conductors or magnetic material and the ability to maintain the electrical insulation or fastening and bundling of conductors or magnetic materials at a high temperature (hereinafter referred to as a "bundling solution") upon drying is coated or the bundling solution is dipped into so as to deposit the bundling solution on the outside of the conductors or magnetic materials or impregnate the bundling solution at the contact parts between conductors, between magnetic materials, between conductors and magnetic materials, and between conductors, magnetic materials, and other members. Next, the bundling solution is made to dry at ordinary temperature or more to bundle the conductors and magnetic materials or these and other members. The drying condition in the present invention is sufficient drying at room temperature to 120° C. or so, but by drying at 80 to 200° C. for at least 30 seconds to obtain a sufficient coating effect, extremely fast drying and curing become possible.

In the present invention, the coating formed by drying the bundling solution covers the outside surfaces of the magnetic materials or other members etc. and bundles them together. Alternatively, the bundling solution invades the adjoining conductors, magnetic materials, etc. and bonds and bundles them when dried. (Hereinafter the coating or layer formed after drying of the bundling solution being referred to as a "bundling film".) Therefore, since the bundling power is determined by the type and thickness of the bundling film, it is sufficient to determine the type of the bundling solution and film thickness in accordance with need. Further, the bundling power changes according to the shapes of the conductors and magnetic materials and the state of the surface or end faces, so it is necessary to consider the shapes of the conductors and magnetic materials and the state of the surface or end faces as well.

As the bundling solution, a solution mainly comprised of one or more types of pure silicone polymers is used. A pure silicone polymer is a compound produced by a hydrolysis reaction and dehydration condensation reaction of, one or more types of organic silicon compounds expressed by $(R^1)_n Si(X^1)_{4-n}$ (where n is an integer of 0 to 3, $R^1$ is an alkyl group or phenyl group, the plurality of $R^1$ able to be different when n=2 or 3, $X^1$ being an alkoxy group expressed by Cl or $O(R^2)$, where $R^2$ is an alkyl group, and the plurality of $R^2$ able to be different when n=0, 1, or 2). These are produced by hydrolysis and polymerization of a known alkoxysilane without a solvent or in an organic solvent. At this time, by changing the type of the silane used, coatings having various performances are obtained.

In general, pure silicone polymers include types called a heat curing type and moisture curing type. In the present invention, the former heat curing type is preferably used. The "heat curing type", as explained above, is comprised of an organic silicon compound, methanol, ethanol, isopropanol, butanol, or other alcohol having a low boiling point, and water. Therefore, in the curing process, by drying at a low temperature of about 120° C. or less, the solvent component can be vaporized and expelled in an extremely short time and a dense coating of Si—O bonds can be formed by drying for several minutes to several tens of minutes. In the case of the latter moisture curing type, a hydrolysis reaction is caused by absorption of the moisture in the air and the coating is cured and a coating formed by the effect of the added catalyst. Therefore, sometimes it takes several days for the curing of the coating to proceed. Further, in this case, the formation and curing of the coating are not achieved unless moisture is supplied from the atmosphere. When applied to stacked sheets, in particular large area materials as in the applications of the present invention, the curing proceeds at the end faces and supply of moisture into the interior becomes difficult so sometimes the coating at the inside cannot be cured even after several weeks and therefore there is the problem that constant of the curing time cannot be obtained.

In the heat curing type of the present invention, if heating to more than the boiling point of the solvent, the solvent can be simply broken down and expelled. This is an extremely great merit in terms of industrialization.

Further, when trying to obtain a high insulation resistance and breakdown voltage in the bundling coating, 0.1 to 50 parts by weight in terms of solid content of one or more types of inorganic oxide powder particles or a colloidal solution, organic resin powder particles, or an emulsion solution of the same is added to the silicone polymer as a filler with respect to 100 parts by weight worth of $SiO_2$ of the pure silicone polymer. As a composite effect of addition of this filler, the deposition power to the core end faces or steel sheet surface is improved. As the inorganic powder particles or colloidal substance added, 0.1 to 50 parts by weight of one or more types of $SiO_2$, $Al_2O_3$, $TiO_2$, $ZrO_2$, and/or composites of the same having a primary particle size of 7 to 5,000 nm is added and blended. Since the conditions of use have an effect on the stability of the solution, use of a substance having a primary particle size of not more than 0.5 μm is more preferable.

In the present invention, when trying to obtain a bundling film superior in heat resistance, if the organic silicon compound contains at least 80% of at least n=0, 1 in the general formula expressed by $(R^1)_n Si(X^1)_{4-n}$ (where n is an integer of 0 to 3, $R^1$ is an alkyl group or phenyl group, the plurality of $R^1$ able to be different when n=2 or 3, $X^1$ being an alkoxy group expressed by Cl or $O(R^2)$, where $R^2$ is an alkyl group, and the plurality of $R^2$ able to be different when n=0, 1, or 2), and if making the ratio of the case where n=0 and the case where n=1 a range of 1:20 to 4:1, a more superior performance of the bundling film is obtained. In particular, the higher the ratio of the component of n=0, the greater the hardness of the coating. Further, the obtained bundling film becomes resistant to cracking. This is advantageous for use at the time of use at a high temperature. Further, in general, the drying is fast and the work efficiency in drying is improved. However, as the n=0 component becomes too hard, there is a problem that a thick coating can no longer be obtained due to the problem of cracking in the process of drying of the coating. That is, when the ratio of the case where n=0/case where n=1 is less than 0.05 (1:20), the heat resistance becomes inferior, so this is set as a limit. On the other hand, if the ratio becomes more than 4 (4:1), the heat resistance is improved, but there is the problem of cracking of the coating and obtaining a thick coating becomes difficult, so this is set as a limit.

To increase the electrical insulation, it is sufficient to add and blend as an additive 0.1 to 10 parts by weight of one or more compounds selected from $SiO_2$, $Al_2O_3$, $TiO_2$, and mixtures of the same having a primary particle size of 7 to 5,000 nm.

The method of coating the bundling solution or the method of dipping in the bundling solution may be a generally used method of surface coating or painting etc. In addition to spray coating and dipping, brushing or another method may also be used. The unevenness of the amount of coating etc. may also be suppressed by a generally used method. Further, to improve the bonding power at the contact parts of the conductors, magnetic materials, etc., by giving a clearance to the contact parts once, impregnating the bundling solution at the contact parts, then establishing the predetermined contact state, the bundling power after drying can also be increased.

The dried thickness of the bundling film is easy to control by the method of changing the type of the solvent of the bundling solution or the concentration or viscosity of the solvent. If performing the coating and drying step several times, it is possible to increase the film thickness by that amount. The coating is coated to a predetermined thickness by controlling the pullout speed in the case of dipping and the nozzle shape, ejection speed, etc. together with the above solution conditions in the case of spraying. Further, it is possible to suppress solution buildup and adjust the film thickness by blowing compressed air.

The bundling film formed in the present invention may also serve as an electrical insulation coating when electrical insulation is sought and may also serve as a rust-preventing coating. The dried coating according to the present invention is mainly comprised of $SiO_2$ having an Si—O structure and forms a dense film, so exhibits extremely superior insulation and rust prevention functions.

EXAMPLE 1

A cold rolled coil of non-oriented magnetic steel sheet containing 0.35% of Si, 0.002% of Al, and 0.25% of Mn and having a thickness of 0.50 mm was annealed on a continuous annealing line, then a solution comprised, in terms of solid content, of 450 parts by weight of Mg, 120 parts by weight of boric acid, and 5 parts by weight of an acryl-styrene resin emulsion by weight after baking was baked on as an insulation coating agent on the same line at a sheet temperature of 350° C.

Next, a core of a rotor of a 2.2 kw, 200V, and 60 Hz three-phase four-pole cage type induction motor (44 slots, semiclosed, with skew (1.23 times pitch of stator slots)) was prepared by punching pieces out from this coil and calking.

The core was dipped in a coating agent for deposition on the end faces using a solution of the composition shown in Table 1 while changing the thickness of the film after drying, dried at ordinary temperature, and baked at 100° C. for 10 minutes. Next, secondary conductor bars were formed by aluminum diecasting on the core and a shaft inserted to fabricate a rotor of the above induction motor. The loss was found from the no-load characteristics of the motor to confirm the effect of the present invention.

Further, at this time, some of the annealed material (before treatment to give an insulation coating) was taken from the production line of the non-oriented magnetic steel sheet, 10×30 cm samples were cut out, and the samples were coated with the above solution using a bar coater while changing the thickness of the coating after drying, then similarly baked, and used for evaluation of the breakdown voltage, coating density, corrosion resistance, etc.

The state of coating and magnetic characteristics of the core in the test and the results of evaluation of the insulation coatings before and after annealing in materials coated on the surface of steel sheet are shown in Table 2 and Table 3.

As a result of this test, when treating the core end faces with the insulation coating agent of the present invention, a transparent coating with good luster was formed and an extremely superior corrosion resistance and heat resistance were exhibited. As opposed to this, in the case of treating a comparative material with a conventional varnish or insulation coating agent, oil deposited at the time of punching had a great effect. The insulation coating deposited unevenly, so the corrosion resistance ended up becoming extremely poor compared with a core coated with the agent of the present invention.

Further, even when cleaning off the oil using acetone as pre-treatment in Comparative Examples 1 and 2, the state of deposition of the coating on the end faces became uneven and results considerably inferior to those of the present invention were obtained even in the coating properties.

Further, a comparison of the rate of reduction of iron loss of the core showed that the losses of motors treated in Invention Examples 1 to 12 were reduced 7 to 17%. Further, in the case of Comparative Examples 13 and 14, improvements of about 4.5% were seen. As opposed to this, in the case of Comparative Example 1, almost no reduction of the loss was seen. Further, in the case of Comparative Example 1, the loss was reduced 5%. In the motor performance as well, with the insulation treatment of the present invention, the loss was clearly reduced compared with the conventional non-insulation treatment or conventional treatment and a higher efficiency of the motor was realized.

Further, looking at the coating properties when conducting a coating test by a bar coater using a cut sheet agent, as shown in Table 3, in the case of use of the agent of the present invention, the corrosion resistance, insulation, and adhesiveness were all extremely excellent. In particular, in the case of coating the pure silicone polymer by hydrolysis of alkoxysilane of Invention Examples 1 to 8, 10, and 11, it was confirmed that extremely excellent results were obtained in the breakdown voltage after annealing as well.

In the example of the mixed silicone polymer of Invention Example 12 as well, considerably good breakdown voltage and coating properties were obtained. Further, in the case of the alkali silicate, colloidal silica, and silicone resin of Invention Examples 13 and 14, while the breakdown voltage, corrosion resistance, and adhesiveness were somewhat inferior to those of the case of the above pure silicone polymer, stable coating performance was obtained compared with the comparative examples.

As opposed to this, in the case of Comparative Examples 1 and 2, the corrosion resistance and adhesiveness were extremely poor compared with the present invention. In particular, with the conventional varnishing, the coating was substantially completely burned off after annealing and blackened and the corrosion resistance and insulation properties were extremely poor compared with the present invention.

TABLE 1

| Treatment conditions | Treatment agent conditions | Thickness (μm) | Drying conditions |
|---|---|---|---|
| Inv. Ex. 1 | Hydrolyzed product of tetramethoxysilane, ($SiO_2$ concentration 10%): 70 cc<br>Hydrolyzed product of monomethyltriethoxysilane ($SiO_2$ concentration 10%): 30 cc | 1.5 | Room temp. 15 min -> 100° C. × 5 min |
| Inv. Ex. 2 | Hydrolyzed product of tetramethoxysilane ($SiO_2$ concentration 10%): 70 cc<br>Hydrolyzed product of monomethyltriethoxysilane ($SiO_2$ concentration 10%): 30 cc | 3.0 | Room temp. 15 min -> 100° C. × 5 min |
| Inv. Ex. 3 | Hydrolyzed product of tetramethoxysilane ($SiO_2$ concentration 10%): 70 cc<br>Hydrolyzed product of monomethyltriethoxysilane ($SiO_2$ concentration 10%): 30 cc | 5.0 | Room temp. 15 min -> 100° C. × 5 min |
| Inv. Ex. 4 | Inv. Ex. 3 double coating (coating->drying-coating->drying) | 10.0 | Room temp. 15 min -> 100° C. × 5 min |
| Inv. Ex. 5 | Hydrolyzed product of monomethyltriethoxysilane (20%): 75 cc<br>Hydrolyzed product of tetraethoxysilane (20%): 15 cc<br>Hydrolyzed product of dimethyldiethoxysilane (20%): 10 cc | 5.0 | Room temp. 5 min -> 150° C. × 5 min |
| Inv. Ex. 6 | Hydrolyzed product of monomethyltrimethoxysilane: 100 cc +<br>particle size 15 nm $Al_2O_3$ 1% - $SiO_2$ mixed powder: 1.5 g | 1.5 | Room temp. 5 min -> 150° C. × 5 min |
| Inv. Ex. 7 | Hydrolyzed product of monomethyltrimethoxysilane: 100 cc +<br>particle size 15 nm $Al_2O_3$ 1% - $SiO_2$ mixed powder: 1.5 g | 5.0 | Room temp. 5 min -> 150° C. × 5 min |
| Inv. Ex. 8 | Inv. Ex. 7 -> Inv. Ex. 5 (double coating) | 1.5 + 3.5 | Room temp. 5 min -> 150° C. × 5 min |
| Inv. Ex. 9 | Alkali-modified silicone (acrylic monomer, methacrylsilane reaction product) | 5.0 | Room temp. (25° C.) 120 min |
| Inv. Ex. 10 | Hydrolyzed product of tetramethoxysilane ($SiO_2$ concentration 10%): 70 cc<br>Hydrolyzed product of monomethyltriethoxysilane ($SiO_2$ concentration 10%): 30 cc | 5.0 | Room temp. 15 min -> 100° C. × 5 min |
| Inv. Ex. 11 | Hydrolyzed product of dimethyldimethoxysilane (15%): 20 cc<br>Hydrolyzed product of phenyltriethoxysilane (15%): 30 cc<br>Hydrolyzed product of tetraethoxysilane (15%): 50 cc +<br>particle size 500 nm $SiO_2$ powder: 2.5 g | 5.0 | Room temp. 15 min -> 100° C. × 5 min |
| Inv. Ex. 12 | Polydiphenylsiloxane polymer | 5.0 | 150° C. × 20 min |
| Inv. Ex. 13 | Alkali silicate ($Na_2O.SiO_2$) 100 g + colloidal silica (30%) 50 g | 5.0 | 100° C. × 15 min |
| Inv. Ex. 14 | Silane diol polymer | 5.0 | 150° C. × 15 min |
| Comp. Ex. 1 | Polyimide varnish | 5.0 | 150° C. × 2 hr |
| Comp. Ex. 2 | 50 Al phosphate 100 L + $CrO_3$ 10 kg + 30% colloidal silica 40 L | 5.0 | 300° C. × 10 min |

TABLE 2

| Treatment conditions | Coating-forming state (appearance after conditions drying) | Corrosion resistance (50° C., 120 hr, humidity 80%) | End face coating state after annealing of core*1 |
|---|---|---|---|
| Inv. Ex. 1 | VG, uniform transparent coating formed | VG, no rust occurring | VG, no change at all |
| Inv. Ex. 2 | VG, uniform transparent coating formed | VG, no rust occurring | VG, no change at all |
| Inv. Ex. 3 | VG, uniform transparent coating formed | VG, no rust occurring | VG, nc change at all |
| Inv. Ex. 4 | VG, uniform transparent coating formed | VG, no rust occurring | VG, no change at all |
| Inv. Ex. 5 | VG, uniform transparent coating formed | VG, no rust occurring | VG, no change at all |
| Inv. Ex. 6 | VG, uniform transparent coating formed | VG, no rust occurring | VG, no change at all |
| Inv. Ex. 7 | VG, uniform transparent coating formed | VG, no rust occurring | VG, no change at all |
| Inv. Ex. 8 | VG, uniform transparent coating formed | VG, no rust occurring | VG, no change at all |
| Inv. Ex. 9 | VG, uniform transparent coating formed | VG, no rust occurring | G, some blackening, luster |
| Inv. Ex. 10 | VG, uniform transparent coating formed | VG, no rust occurring | VG, no change at all |
| Inv. Ex. 11 | VG, uniform transparent coating formed | VG, no rust occurring | VG, no change at all |
| Inv. Ex. 12 | VG, uniform transparent coating formed | VG, no rust occurring | VG, no change at all |
| Inv. Ex. 13 | F-G, transparent, some coating unevenness | G, slight rust at unevenly coated parts | G, some blackening, luster |
| Inv. Ex. 14 | VG, uniform transparent coating formed | VC, no rust occurring | G, some blackening, luster |
| Comp. Ex. 1A*2) | F, brown, much coating unevenness | F, much rust at poorly coated parts | P, blackening, no luster |
| Comp. Ex. 1B*3) | G, brown, some coating unevenness | G-F, some rust at unevenly coated parts | P, blackening, no luster |
| Comp. Ex. 2A*2) | F-P, white turbidity, much coating unevenness | F-P, much rust at poorly coated parts | F-P, white turbidity, majority detached |
| Comp. Ex. 2B*3) | P, very much coating unevenness | P, much rust at poorly coated parts | F-P, white turbidity, majority detached |

*1) Annealing: 700° C. × 5 min, $N_2$.
*2) Comp. Ex. 1A and 2A are as punched in same way as Inv. Ex. 1 to 14.
*3) Comp. Ex. 1B and 2B are degreased by solvent (acetone dipping and washing) as pre-treatment.

TABLE 3

| | Coating forming state (appearance after drying) | Corrosion resistance (50° C., 120 hr, humidity 80%) | Adhesiveness*4) Before annealing | Adhesiveness*4) After annealing*5) | Breakdown voltage (n = 10 average) Before annealing | Breakdown voltage (n = 10 average) After annealing*5) |
|---|---|---|---|---|---|---|
| Inv. Ex. 1 | VG, uniform transparent coating formed | VG, no rust occurring | VG, no peeling | VG, no peeling | 80 | 78 |

TABLE 3-continued

|  | Coating forming state (appearance after drying) | Corrosion resistance (50° C., 120 hr, humidity 80%) | Adhesiveness*4) | | Breakdown voltage (n = 10 average) | |
|---|---|---|---|---|---|---|
|  |  |  | Before annealing | After annealing*5) | Before annealing | After annealing*5) |
| Inv. Ex. 2 | VG, uniform transparent coating formed | VG, no rust occurring | VG, no peeling | VG, no peeling | 200 | 200 |
| Inv. Ex. 3 | VG, uniform transparent coating formed | VG, no rust occurring | VG, no peeling | VG, no peeling | 220 | 230 |
| Inv. Ex. 4 | VG, uniform transparent coating formed | VG, no rust occurring | VG, no peeling | VG, no peeling | 260 | 250 |
| Inv. Ex. 5 | VG, uniform transparent coating formed | VG, no rust occurring | VG, no peeling | VG, no peeling | 250 | 210 |
| Inv. Ex. 6 | VG, uniform transparent coating formed | VG, no rust occurring | VG, no peeling | VG, no peeling | 180 | 200 |
| Inv. Ex. 7 | VG, uniform-transparent coating formed | VG, no rust occurring | VG, no peeling | VG, no peeling | 300< | 300< |
| Inv. Ex. 8 | VG, uniform transparent coating formed | VG, no rust occurring | VG, no peeling | VG, no peeling | 300< | 300< |
| Inv. Ex. 9 | VG, uniform transparent coating formed | VG, no rust occurring | VG, no peeling | G, some peeling | 150 | 40 |
| Inv. Ex. 10 | VG, uniform transparent coating formed | VG, no rust occurring | VG, no peeling | G-VG, some peeling | 250 | 220 |
| Inv. Ex. 11 | VG, uniform transparent coating formed | VG, no rust occurring | VG, no peeling | G-VG, some peeling | 300< | 300< |
| Inv. Ex. 12 | VG, uniform transparent coating formed | VG, no rust occurring | VG, no peeling | VG, no peeling | 250 | 200 |
| Inv. Ex. 13 | VG, uniform transparent coating formed | G, some rust occurring | VG, no peeling | G, some peeling | 130 | 60 |
| Inv. Ex. 14 | VG, uniform transparent coating formed | VG, no rust occurring | VG, no peeling | F-G, some peeling | 150 | 40 |
| Comp. Ex. 1 | F, brown, no luster, uneven color | G-F, rusting at unevenly coated parts | F, 50% peeling | P, complete peeling | 100 | 0 |
| Comp. Ex. 2 | P, white turbidity, much uneven coating | F, much rust occurring | F, 95% peeling | G, small peeling | 160 | 120 |

*4)Bent face observed after 5 mmφ bending.
*5)Annealing: 700° C. × 30 sec, atmosphere $N_2$, surface appearance after annealing

EXAMPLE 2

Each agent of the present invention of the pure silicone polymer compositions shown in Table 4 was used in the same way as in Example 1 to bake an insulation coating to give a film thickness after drying of 5 μm on the surface of non-oriented magnetic steel sheet of a sheet thickness of 0.5 mm. Next, the steel sheet with this insulation coating was stacked, annealed at 400° C.×1 hr in the air, and examined as to the heat resistance of the coating. The results are shown in Table 4.

As a result of the tests, when treating sheets with solutions based on the pure silicone polymers of the present invention, in each case, a transparent lustrous coating state was maintained even after annealing at 400° C. for 1 hour and no drop in adhesiveness or insulation could be observed. As opposed to this, in the case of an organic type varnish of the comparative material, a remarkable drop in the surface appearance, adhesiveness, and insulation occurred due to the annealing.

TABLE 4

|  | Treating agent conditions | Surface appearance after annealing | Adhesiveness after annealing (10 mmφ bending) | Breakdown voltage | |
|---|---|---|---|---|---|
|  |  |  |  | Before annealing | After annealing |
| Inv. Ex. 1 | Hydrolyzed product of tetraethoxysilane: 50 cc<br>Hydrolyzed product monomethyltriethoxysilane: 50 cc | Transparent, luster | No peeling | 230 | 220 |
| Inv. Ex. 2 | Hydrolyzed product of monomethyltriethoxysilane: 70 cc<br>Hydrolyzed product of tetraethoxysilane: 15 cc<br>Hydrolyzed product of dimethyldiethoxysilane: 15 cc | Transparent, luster | " | 240 | 250 |
| Inv. Ex. 3 | Hydrolyzed product of dimethyldimethoxysilane: 40 cc<br>Hydrolyzed product of phenyltriethoxysilane: 10 cc<br>Hydrolyzed product tetraethoxysilane: 50 cc<br>Particle size 15 nm $Al_2O_3$ powder: 0.5 g | Transparent, luster | " | 270 | 260 |
| Inv. Ex. 4 | Hydrolyzed product of monomethyltriethoxysilane: 70 cc<br>Hydrolyzed product of tetraethoxysilane: 15 cc<br>Particle size 200 nm $SiO_2$ powder: 2 g | Transparent, luster | " | 300< | 300< |
| Comp. Ex. 1 | Polyimide varnish | Black-brown, no luster | Much peeling | 65 | 10 |

EXAMPLE 3

A stator (armature) core treated on its surface using the present invention was used to prepare a microturbine generator. The stator core was obtained by punching from a magnetic steel sheet and calking and has bolt holes for fastening the core.

Next, the stator core was treated by Invention Example 1 of Example 1, the stator core was inserted into the case, then the core was bolted. In the past, since the core contacted the case or bolts and the calked layers contacted each other, a short-circuiting current flowed through the core, so the loss increased and there was a large temperature rise in the stator. If applying the present invention, it is possible to reduce and avoid the above short-circuiting current and possible to keep the temperature rise down to an average 3 degrees.

EXAMPLE 4

Cores treated on their end faces utilizing the present invention were combined to produce an XY linear motor. In this XY linear motor, since the flow of magnetic flux was three dimensional, cores punched out from ordinary magnetics steel sheet were combined at right angles.

Conventional cores contacted each other at their end faces, but insulation paper was sandwiched between the cores, so in the case of core contact, there was an increase in loss due to contact of the end faces and much variance in performance. On the other hand, if insulation paper was inserted, the clearance became relatively greater, the excitation current became greater, and an increase in the no-load resistance loss was caused.

If the insulation treatment method of the present invention was used to treat the end faces of the U-shaped cores and two cores were combined, the loss was reduced and variance in performance was also reduced.

EXAMPLE 5

The core of a pump motor was protected from corrosion by wrapping a stainless steel cover at the clearance side between the rotor and stator to protect the core in the case of use of magnetic steel sheet for the core material or using ferritic stainless steel for the core material.

In the former case, the structure was complicated. An eddy current loss occurred at the stainless steel cover, the clearance became greater, etc., so a drop in output was unavoidable. In the latter case, since the saturation magnetization of the ferritic stainless steel was low, a drop in output was caused. Therefore, the motor was produced by treating a core made of magnetic steel sheet according to the present invention.

The core treated for insulation by the present invention was also treated at its end faces. It was superior in corrosion resistance, needless to say, and also simple in structure and could be made using high saturation magnetization magnetic steel sheet, so there was no problem in a drop of output. There was no rust even after 100 hours of operation, and the motor performance was the same as an ordinary motor other than a pump motor.

EXAMPLE 6

A 50H800 non-oriented magnetic steel sheet was punched, strain annealed, and used to produce a core for use for a small-sized 48 mm audio power transformer. The capacity was 100VA (100V/6V:1A/16A).

In this case, condition 1 was that it be punched while being calked, while condition 2 was that it be punched without being calked.

The present invention was applied to condition 2. That is, the core surface, including the end faces, was sprayed with a partial condensate obtained from diphenyldiethoxysilane, dimethylmonomethyltriethoxy-silane, and tetraethoxysilane in a 1:4:5 ratio and dried to form a film. At this time, the coating treatment was performed twice, accompanied with drying by warm air at 75° C. for 5 minutes, to obtain an average film thickness of 7 μm. Next, the winding was attached to complete the assembly.

Condition 1 was used to produce a power transformer by a conventional method without using the present invention. The transformer of condition 1 did not have its core completely fastened. Noise occurred and it was necessary to provide holders for separate fastening. With the transformer of condition 2 according to the present invention, however, there was almost no noise from the core and extra holders were not required.

EXAMPLE 7

Figure 2:
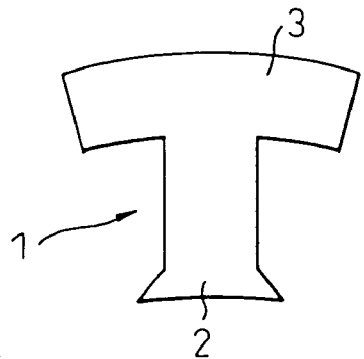
FIG. 2 is a view of a divided core piece.
Figure 3:
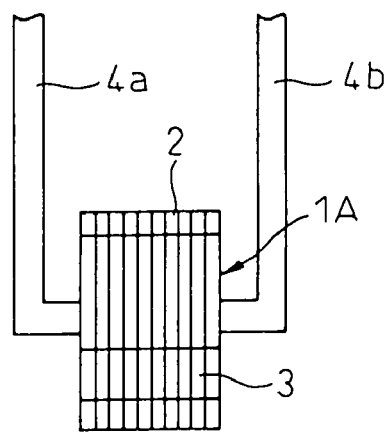
FIG. 3 is a view of the state of the stacked divided core pieces held and fastened.
Figure 4:
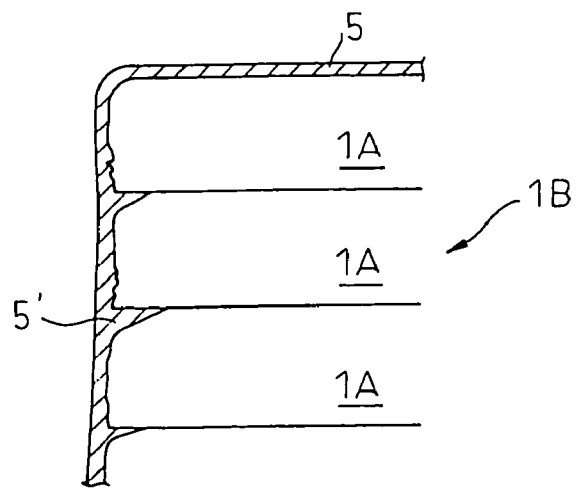
FIG. 4 is a partial detailed view of stacked divided core pieces formed with a bundling film.

The present invention was used to produce a brushless DC motor of a four-pole motor. The bundling solution used was a partial condensate (concentration 20%) obtained from monomethyltrimethoxysilane and tetramethoxysilane in a ratio of 3:1 in parts by weight which was dried to form a bundling film. The stator was an armature comprised of 12 divided core pieces (core pieces 1 shown in FIG. 2 stacked together). The outside diameter of the assembled circular core was 120 mm. The divided core pieces 1A were punched from magnetic steel sheet and stacked. The centers of the magnetic steel sheets at the top and bottom of the stack were held by the bars 4a and 4b of FIG. 3 to fasten the stack. Bundling solution was coated on only the punched end faces—not the end faces of the teeth 2 corresponding to the clearance side with the rotor. Next, the stack was dried at room temperature while fastened to form the bundling film. The bundling solution was coated by the method of sufficiently coating only the processed end faces by brushing. In this case, the bundling solution was impregnated in the brush and coated so as to give an average film thickness after drying of 10 μm at the clearance 5' (FIG. 4) formed by the sloped parts of the punching at the processed end faces of the stacked core.

Figure 5:
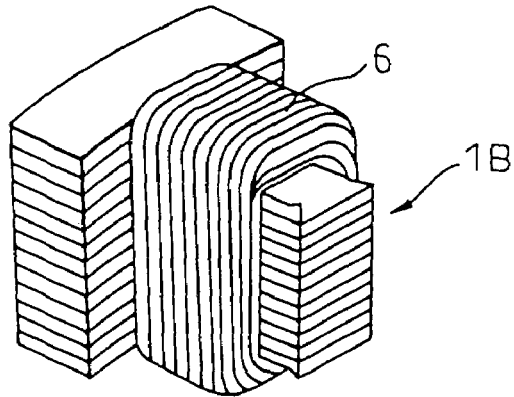
FIG. 5 is a perspective view of stacked divided core pieces providing with a winding on a bundling film.
Figure 6:
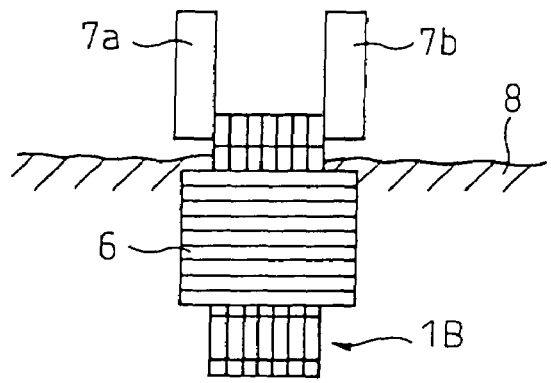
FIG. 6 is a view of the state of stacked divided core pieces provided with a winding dipped in a bundling solution.
Figure 7:
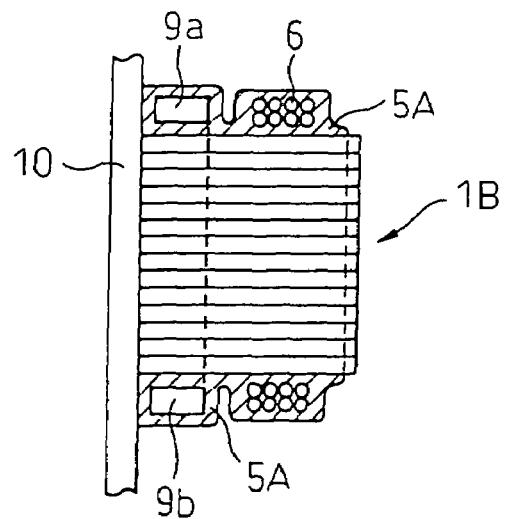
FIG. 7 is a view of the state of stacked divided core pieces bundled in a case.

Next, the winding 6 was directly wound around the divided core pieces 1B having the bundling film while drying the bundling solution as shown in FIG. 5. Further, as shown in FIG. 6, the portions other than the clearance side were dipped in the bundling solution and dried. Due to this, the winding was fastened and the bundling strength and rigidity of the core was heightened. Next, the divided core pieces were assembled, cauls 9a and 9b were placed against the top and bottom surfaces of the core pack of the core, and simultaneously the assembly was press fit into the case 10. When placing the cauls, the bundling solution was coated on the surfaces contacting the core and then the cauls placed on the core. The assembly of the divided core pieces with the cauls placed was then coated with the bundling solution on its outer circumference and press fit into the case as shown in FIG. 6. Next, this was completely dried.

If using the method of the present invention, electrical insulation and fastening and bundling between the conductors, between layers of the magnetic steel sheet, between the conductors and divided core pieces, between the divided core pieces, and between the core and the case become possible from ordinary temperature to the temperature of the state which the permanent magnets used in the motor can breakdown or more than 500° C. Therefore, since this is higher than the conventional 200° C. heat resistant winding temperature, it is possible to pass a larger current through the winding and obtain a higher output. Further, the rigidity of the motor as a whole becomes higher and therefore becomes one means against noise and vibration. If using bundling according to the present invention, it is possible to suppress the short-circuiting current causing a problem in calking, welding, etc. and to reduce the loss and improve the controllability. Further, it is possible to improve the escape of the heat generated from the conductors and core through the bundling film of the present invention. From this viewpoint as well, this is effective in raising the output of the motor and lowering the resistance loss (suppressing the increase in resistance due to the rise in temperature).

EXAMPLE 8

A four-pole IPM (implanted magnet) motor was produced by the armature produced in Example 7 and the IPM rotor using the present invention. This motor is controlled in torque at a low speed. The motor was dipped in a bundling solution comprised of a partial condensate obtained from monomethyltriethoxysilane and tetraethoxysilane in a 1:3 ratio containing, as a filler with respect to 100 parts by weight of the same converted to $SiO_2$, 2 g of $Al_2O_3$ of a particle size of 10 nm to give an average film thickness after drying of 5 μm. This was dried to form a bundling film.

Figure 8A:
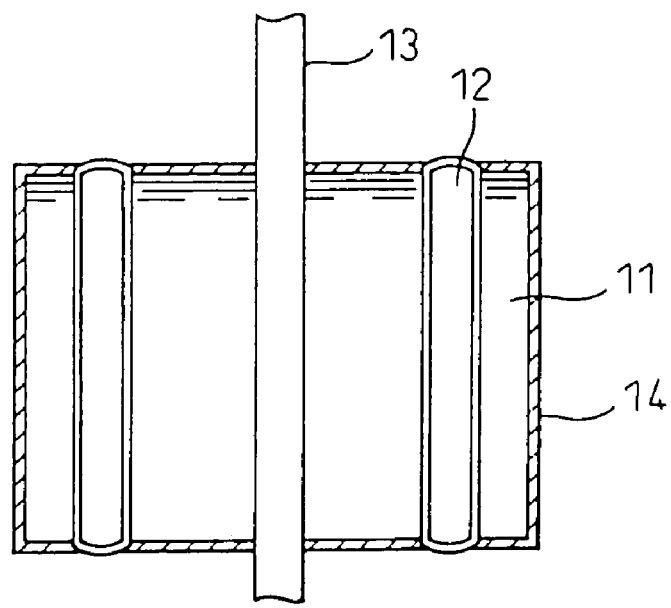
FIG. 8 is a sectional view (a) and plan view (b) of an IPM rotor.
Figure 8B:
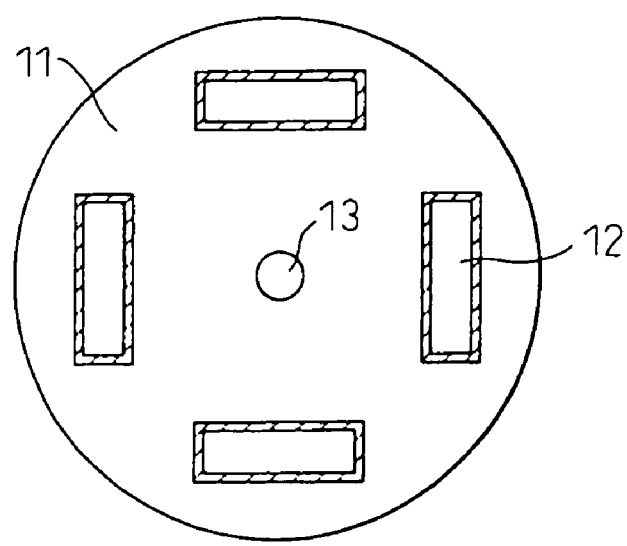

A magnetized SmCo sintered magnet was dipped in the bundling solution and dried. As shown in FIG. 8, this magnet 12 was inserted into the IPM rotor core 11. The rotor core with the magnet inserted was also dipped in the bundling solution. The excess bundling solution was removed while spraying compressed gas, then the core was press fit over a shaft 13. This assembly was then dried to form the bundling film 14 of the partial condensate. Use of the present invention for the rotor serves both to fasten the magnet and insulate the surface of the magnet from ordinary temperature to the temperature of the state which the SmCo magnet can breakdown (about 500° C.). Further, it can improve the heat conductivity and insulation between the magnet and the core and suppress the rise in temperature of the magnet and suppress short-circuiting current between the magnet and core. The clearance between the rotor and shaft is filled by the bundling film and serves to suppress the rise in temperature of the rotor. An SmCo magnet can be used at a higher temperature than an FeNdB magnet, but the temperature rise of the SmCo sintered magnet can also be suppressed and the reduction of magnetization of the magnet can also be suppressed.

EXAMPLE 9

The present invention was used to produce a two-pole induction motor. The bundling solution used was a partial condensate obtained from diphenylethoxysilane, dimethyl-monomethyltriethoxysilane, and tetraethoxysilane in a 1:5:4 ratio. This was dried to form a bundling film. The stator core was an integral punched core provided with calking for provisional fastening at three locations at equal distances in the circumferential direction 2 mm from the outer circumference. The bundling solution was sprayed onto the slot of the core as a whole and dried to form a bundling film. At this time, coating treatment was performed two times interposed with drying by warm air at 5° C. for 5 minutes to obtain an average film thickness of 7 μm. Next, the bundling solution was deposited on the armature winding and the surface of the winding dried. The dried winding was inserted into the slot of the stator core by an inserter. Next, the armature as a whole was dipped in the bundling solution. 100° C. hot air was blown from the clearance side with the rotor to blow away solution deposited on the teeth-edges in excess to reduce the film thickness of the clearance surface to less than 0.1 mm. The 100° C. hot air had the effect of speeding up the drying. Finally, this was dried at 300° C. to form the final bundling film.

If the present invention is used, use is possible up to 500° C. Bundling of the stacked core up that temperature, suppression of the short-circuiting current, reduction of noise by reduction of vibration of the teeth-edges, increase of output by higher heat discharge, and lower resistance loss (suppression of increase in resistance due to temperature rise) can be expected.

EXAMPLE 10

An induction motor was produced by the armature core produced in Example 9 and an aluminum diecast rotor using the present invention. The rotor was obtained by dipping a punched core into a bundling solution and drying to bundle it, then performing aluminum diecasting. The bundling solution used was a mixed solution of monomethyltrimethoxysilane, tetramethoxysilane, and dimethyldimethoxysilane in a 5:3:2 ratio. This was dried to form a bundling film.

The bundling film formed by drying can breakdown even aluminum diecasting, so short-circuits between the secondary conductor aluminum conductors and core can be suppressed. Therefore, stabilization of the high output performance of the induction motor can be realized.

EXAMPLE 11

A bundling solution was coated and dried on the surface of a winding. The winding was attached, then the wound transformer core was dipped in a bundling solution and dried. The bundling solution used was a partial condensate obtained from diphenyltriethoxy-silane and monoethyltriethoxysilane in a 1:9 ratio. The coating treatment was performed three times interposed with drying by warm air at 80° C. for 15 minutes, then the coating was dried to form a bundling film.

By applying the present invention to a transformer core, it is possible to operate at even 200° C., improve the rigidity of the core, and reduce the noise by 3 dB.

EXAMPLE 12

Figure 9:
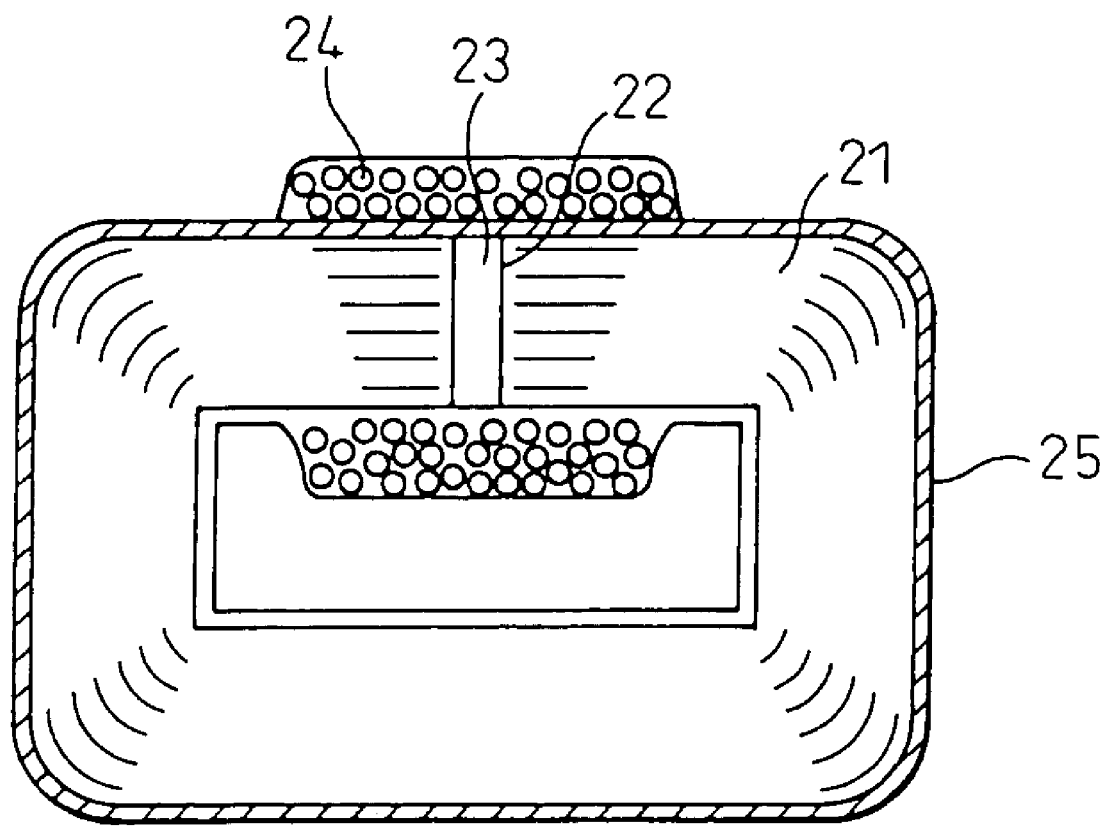
FIG. 9 is a sectional view of a reactor formed with a bundling film.

The present invention was used to produce a core with a slot which was used for a reactor for a booster chopper. As shown in FIG. 9, a wound core 21 was formed and dipped in a bundling solution comprised of a partial condensate obtained from diphenyldiethoxy-silane and tetramethoxysilane in a 1.5:8.5 ratio and dried in that state. The core stack was bundled while maintaining that shape. Next, the slot 22 was formed by holding the area near the formation of the slot and cutting. On the other hand, the winding to be inserted into the cut wound core was obtained in advance by winding and shaping wire with the bundling solution deposited and dried on its surface, then again dipping it into the bundling solution and drying. Next, the formed and wound was inserted into the cut core and the two cut parts of the core made to face each other at the cut part to provide a slot. To maintain the slot, a nonmagnetic insulator 23 was inserted, then the winding 24 was attached. In this state, the assembly was again inserted into the bundling solution to form a bundling film 25 which was then dried.

This bundling film can at least breakdown a temperature up to 500° C. This reactor can sufficiently operate up to the temperature which the parts other than the reactor can breakdown. The core itself is high in rigidity. The slot, which becomes a cause behind noise and vibration, is also comprised of an integral structure. Therefore, the noise can be reduced.

EXAMPLE 13

An oriented magnetic steel sheet was punched and the pieces helically formed for producing an integral circular armature core for an 8-pole motor. The helical cores were stacked while rotated, the assembly dipped in a bundling solution comprised of a partial condensate obtained from monomethyltrimethoxysilane and tetramethoxysilane in a 1:1 ratio to give a film thickness after drying of 15 μm, then dried for fastening to produce an armature core. Next, this was strain annealed at 800° C. After this, the bundling solution was deposited on the surface of the winding, then the winding was dried at room temperature and attached to the armature core to produce an armature. The wound core of the oriented magnetic steel sheet had peaks in the rolling direction of the oriented magnetic steel sheet and was extremely superior in the magnetic properties of the peaks, so the motor iron loss could be reduced. With the winding, the surface coating peeled off. With the treatment of the present invention, however, a surface coating was formed even at the peeled coating parts and so problems could be avoided. Further, the armature dipped in the bundling solution and dried for fastening could be strain annealed at 800° C., so the strain due to the winding could be removed and the properties of the oriented magnetic steel sheet material made good use of.

EXAMPLE 14

The present invention was used to produce a simple small-sized 500° C. heating furnace.

As the bundling solution, a partial condensate obtained from monomethyltrimethoxysilane and tetramethoxysilane in a 1:1 ratio was used. This bundling solution was deposited on the surface of heater wires. The heater wires were dried at room temperature and arranged on the surface of the inside wall of the heating furnace. The entire inside wall member was again dipped in the bundling solution and dried to prepare an inside wall member with a heater. The heater-equipped inside wall member was then used to produce a heating furnace. The heater wires faced the inside of the furnace, but the surfaces of the heater wires were formed with dried coatings of the bundling solution and therefore the effect of electrical insulation could be maintained up to a high temperature. This heating furnace is simple in structure and suitable for a small-sized heating furnace.

EXAMPLE 15

The present invention was used to produce a bobbin-less movable coil of a voice coil motor for an HDD. As the bundling solution, a partial condensate solution obtained from monomethyltrimethoxysilane and tetramethoxysilane in a 1:1 ratio was used. This bundling solution was deposited on the surface of a rectangle aluminum conductor. The rectangle aluminum conductor was dried at room temperature and wound into a motor coil. Next, the entire formed coil was again dipped into the bundling solution and dried to produce a movable coil. The fastening and insulation by the bundling solution used in the present example did not pose problems even at the melting point of aluminum and were advantageous in terms of mechanical vibration and strength as well, which become problems in movable coils of voice coil motors.

EXAMPLE 16

A four-pole IPM (implanted magnet) motor was produced by the armature core produced in Example 16 and the IPM rotor using the present invention. This motor was controlled in torque at a low speed. The bundling solution used was a mixed solution of tetramethoxysilane, monomethyltrimethoxysilane, and diphenyldiethoxysilane in a 2:1:1 ratio. This was dried to form a bundling film.

A magnetized FeNdB sintered magnet was dipped in the bundling solution and dried. As shown in FIG. 8, this magnet 12 was inserted in to the IPM rotor core 11. The rotor core with the magnet inserted was also dipped in the bundling solution. The excess bundling solution was removed while spraying compressed gas, then the core was press fit over a shaft 13. This assembly was then dried to form the bundling film 14 of the partial condensate. Use of the present invention for the IPM rotor served both to fasten the magnet and treat the surface of the magnet, improved the heat conductivity and insulation between the magnet and the core, suppressed the rise in temperature of the magnet, and suppressed short-circuiting current between the magnet and core. The clearance between the rotor and shaft was filled by the bundling film and served to suppress the rise in temperature of the rotor. The temperature rise of the FeNdB sintered magnet could also be suppressed and the reduction of magnetization of the magnet could also be suppressed.

EXAMPLE 17

The present invention was used to produce a two-pole induction motor. The bundling solution used was monomethylmethoxysilane. This was dried to form a bundling film. The stator core is an integral punched core provided with calking for provisional fastening at three locations at equal distances in the circumferential direction 2 mm from the outer circumference. The slot of the core was covered by insulation paper, the armature winding attached, then the entire armature was dipped in the bundling solution. Next, 100° C. hot air was blown from the clearance side with the rotor to blow away solution deposited on the peak parts in excess to reduce the film thickness of the clearance surface to less than 0.1 mm. Next, this was dried to form a bundling film. The 100° C. hot air had the effect of speeding up the drying.

If using the present invention, bundling of the stacked core, suppression of short-circuiting current, reduction of noise by reduction of the vibration at the peak parts, higher output by high heat release, and lower resistance loss (suppression of increased resistance due to temperature rise) can be expected.

EXAMPLE 18

A wound transformer core provided with a winding was dipped in a bundling solution and dried. The bundling solution used was a modified silicone polymer, that is, an epoxy-modified polymer. This was dried to form a bundling film.

By applying the present invention to a transformer core, the rigidity of the core was improved and the noise reduced by 3 dB.

EXAMPLE 19

In Example 7, the stator was dipped in a bundling solution and dried for stacking and bundling, then was annealed at 750° C. This annealing reduced the motor iron loss by 8%.

EXAMPLE 20

The present invention was used to produce a core with a slot which was used for a reactor for a booster chopper. As shown in FIG. 9, a wound core 21 was formed and dipped in a bundling solution and dried in that state. The core stack was bundled while maintaining that shape. Next, the slot 22 was formed by holding the area near the formation of the slot and cutting to form the slot. To maintain the slot, a non-magnetic insulator 23 was inserted, then the winding 24 was attached. In this state, the assembly was again inserted into the bundling solution to form a bundling film 25 which was then dried.

This reactor featured a high rigidity of the core itself. Further, the slot, which becomes a cause behind noise and vibration, was also comprised of an integral structure. Therefore, the noise could be reduced.

EXAMPLE 21

An oriented magnetic steel sheet was punched and the pieces helically formed for producing an integral circular armature core for an 8-pole motor. The helical cores were stacked while rotated, and the assembly dipped in a bundling solution to dry to fasten it and produce an armature core. The wound core of the oriented magnetic steel sheet had peaks in the rolling direction of the oriented magnetic steel sheet. The magnetic properties of the peaks were extremely superior, therefore the motor iron loss could be reduced. With this winding, peeling of the surface coating occurred, but with the treatment of the present invention a surface coating was also formed on the peeled coating part and therefore problems could be avoided.

EXAMPLE 22

A polygon mirror motor for a laser beam printer was produced on a printed circuit board using a magnetic steel sheet. The printed circuit board was a laminate of two magnetic steel sheets. An armature coil was fastened on this. The armature coil and board were fastened and the magnetic steel sheets were bundled using the bundling method of the present invention. The two magnetic steel sheets were stacked, then the armature coil fastened and the assembly dipped in the bundling solution and dried by hot air for fastening. The bundling solution used was maintained in bundling power even with a rise of the coil temperature and free from the problem of out gas, so the bundling of the stack of the two magnetic steel sheets of the printed circuit board and the fastening of the armature coil on the printed circuit board were sufficiently maintained even if the temperature rose due to motor operation. Since there was no problem with out gas either, there was no problem with fogging of the mirror.

EXAMPLE 23

A wound core of a transformer was produced by an amorphous magnetic material, dipped in a bundling solution, then dried while holding its shape. This core was used to produce a transformer, fit into a magnetic shield case, and used while drying the transformer. For the magnetic shield case, use was made of an assembly of panels comprised of nanocrystal high permeance material stacked, dipped in the same bundling solution, and dried for fastening. The amorphous material was extremely thin, so the core or shield plate was low in rigidity, but the members could be simple joined and increased in rigidity by the bundling method of the present invention, fastening of the core or shield plates became easy, and fragments of amorphous metal or nanocrystals were also unlikely to occur.

INDUSTRIAL APPLICABILITY

If there is a short-circuit with the secondary conductors, case, bolts, etc. at the end faces or surface of a core used for a motor or other energy converting device, the loss of the device will increase, the torque, thrust, or output will fall, and the performance will vary. Therefore, treatment of the end faces and surface of the core for insulation is extremely important for the improvement and stabilization of the performance of the device. The ability to perform this insulation treatment easily in a short time is industrially valuable.

According to the present invention, it is possible to treat the end faces of a core to give insulation extremely superior in effect of improvement of the insulation, corrosion resistance, adhesiveness, heat resistance, and magnetic properties at a low temperature and in a short time without cleaning to remove the punching oil, annealing, or other pre-treatment.

Therefore, this method is effective for the improvement and stabilization of the performance of the device. The process is simple, therefore the cost can be lowered and the technique is extremely valuable industrially. Improvement of the efficiency and lowering of the loss of a device are important in terms of energy and the environment. Use of the present invention is therefore also valuable socially. A broad range of applications may be considered such as for household electrical appliances, factory automation devices, office automation devices, automobiles, trains, etc.

Further, the present invention takes note of the fact that if there is a short-circuit with the secondary conductors, case, bolts, etc. at the end faces or surface of a core used for various types of transformers, the loss of the device will increase and damage will occur. Further, it becomes a cause of fluctuations in performance. Therefore, treatment of the end faces and surface of the core for insulation is extremely important for the improvement and stabilization of the performance of the device. The ability to perform this insulation treatment easily in a short time is industrially valuable. Further, this can contribute to the improvement of the properties such as the heat resistance required in the case of annealing after the processing.

Further, the high temperature operating electrical apparatus according to the present invention can achieve a higher heat-resistance temperature of the windings. The fastening and bundling of the winding and the core and yoke comprised of the magnetic materials also do not become a problem at a high temperature. Therefore, it is possible to greatly increase the current flowing through the winding and increase the output of the device. Further, the high temperature operating electrical apparatus can be used at a high temperature location.

The invention claimed is:

1. A core of a motor, actuator or generator having a superior end face insulation characterized in that end faces of the core have an insulation coating of an average film thickness of at least 2.0 μm comprised of at least 30 wt % of a silicon compound converted to $SiO_2$, wherein said insulation coating is an outermost surface of the end faces of the core, and at least one electrically conductive member external to the core contacts with a portion of the insulation coating of at least one end face of the core.

2. A core of a motor, actuator or generator having a superior end face insulation as set forth in claim 1, characterized in that an average film thickness of said insulating coating is more than 10 μm and a breakdown voltage is at least 30V.

3. A core of a motor, actuator or generator having a superior end face insulation as set forth in claim 1 or 2, characterized in that said insulating coating has a heat resistance in air of at least 400° C.×1 hour.

4. A core of a motor, actuator or generator having a superior end face insulation as set forth in claim 1, characterized in that the body of said core is comprised of non-oriented magnetic steel sheet.

* * * * *